United States Patent
Zhang et al.

(10) Patent No.: US 11,340,885 B2
(45) Date of Patent: May 24, 2022

(54) METHOD AND APPARATUS FOR UPDATING OPERATING SYSTEM

(71) Applicant: Huawei Technologies Co., Ltd., Shenzhen (CN)

(72) Inventors: Yajun Zhang, Shenzhen (CN); Shuiping Long, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 410 days.

(21) Appl. No.: 16/496,324

(22) PCT Filed: Mar. 21, 2017

(86) PCT No.: PCT/CN2017/077556
§ 371 (c)(1),
(2) Date: Sep. 20, 2019

(87) PCT Pub. No.: WO2018/170741
PCT Pub. Date: Sep. 27, 2018

(65) Prior Publication Data
US 2020/0034137 A1    Jan. 30, 2020

(51) Int. Cl.
*G06F 8/65* (2018.01)
*G06F 9/4401* (2018.01)

(52) U.S. Cl.
CPC .............. *G06F 8/65* (2013.01); *G06F 9/4406* (2013.01)

(58) Field of Classification Search
CPC .......... G06F 9/4406; G06F 8/65; G06F 8/654; G06F 8/61
See application file for complete search history.

(56) References Cited

U.S. PATENT DOCUMENTS

| | | | |
|---|---|---|---|
| 2003/0167373 A1* | 9/2003 | Winters | G06F 8/654 711/103 |
| 2005/0209991 A1* | 9/2005 | Rogers | G06F 12/0246 |
| 2011/0081950 A1 | 4/2011 | Guven | |
| 2014/0099925 A1 | 4/2014 | Schell et al. | |

(Continued)

FOREIGN PATENT DOCUMENTS

| | | |
|---|---|---|
| CN | 102137182 A | 7/2011 |
| CN | 102572805 A | 7/2012 |

(Continued)

*Primary Examiner* — Kim Huynh
*Assistant Examiner* — Joshua Neveln
(74) *Attorney, Agent, or Firm* — Leydig, Voit & Mayer, Ltd.

(57) ABSTRACT

A method for updating an operating system (OS) comprises: receiving, by an embedded universal integrated circuit card (eUICC), a restart instruction sent by a local profile assistant (LPA) of a terminal device and used to instruct the eUICC to perform a restart operation; sending, to a modem of the terminal device, a first initialization request used to request the modem to control restart of the eUICC; after being restarted, receiving, by the eUICC, a plurality of OS element data packets that are sequentially sent by the LPA; after receiving a part of OS element data packets in the plurality of OS element data packets, parsing, by the eUICC, the OS element data packets received by the eUICC, and installing a first OS based on a parsing result; and deleting, by the eUICC, the first OS element data packet.

20 Claims, 26 Drawing Sheets

(56) References Cited

U.S. PATENT DOCUMENTS

| | | | |
|---|---|---|---|
| 2015/0193224 A1 | 7/2015 | Ziat et al. | |
| 2015/0230070 A1 | 8/2015 | Kadiyala et al. | |
| 2015/0282057 A1 | 10/2015 | Li et al. | |
| 2015/0358757 A1 | 12/2015 | Ford et al. | |
| 2016/0246585 A1* | 8/2016 | Li | H04L 63/0853 |
| 2016/0330175 A1 | 11/2016 | Li et al. | |

FOREIGN PATENT DOCUMENTS

| | | | |
|---|---|---|---|
| CN | 105993182 A | 10/2016 | |
| CN | 106465255 A | 2/2017 | |
| EP | 2448215 A1 | 5/2012 | |
| EP | 3099045 A1 | 11/2016 | |

\* cited by examiner

METHOD AND APPARATUS FOR UPDATING OPERATING SYSTEM

CROSS-REFERENCE TO RELATED APPLICATIONS

This application is a national stage of International Application No. PCT/CN2017/077556, filed on Mar. 21, 2017, which is hereby incorporated by reference in its entirety.

TECHNICAL FIELD

Embodiments of the present invention relate to the field of communications technologies, and in particular, to a method and an apparatus for updating an operating system.

BACKGROUND

As an access authentication and identity authentication module, a smart card is one of devices required by a terminal device in a mobile communications network. For example, an embedded universal integrated circuit card (embedded UICC, eUICC) is a smart card. The eUICC can download and store a subscription information set (profile) and an application (applet) whose identity is authenticated by an operator.

The eUICC can further support updating of the profile, the applet, and an operating system of the eUICC, and updating of a card operating system (Chip Operating System, COS) of the eUICC.

However, a capacity of storage space of the eUICC is limited. For example, the capacity of the storage space of the eUICC is generally smaller than 1 MB, and a part of the storage space of the eUICC needs to be used to store information about the downloaded profile and applet, and back up an installation file of the operating system currently installed in the eUICC. Therefore, when an update package of the operating system of the eUICC is relatively large, remaining storage space of the eUICC may be insufficient for downloading and storing the relatively large update package of the operating system. Consequently, the operating system of the eUICC fails to be updated, and the eUICC cannot install a new operating system.

SUMMARY

This application provides a method and an apparatus for updating an operating system, to resolve a problem that due to a limited capacity of storage space of an eUICC, an operating system of the eUICC fails to be updated and the eUICC cannot install a new operating system.

To achieve the foregoing objectives, the following technical solutions are used in this application.

A first aspect of this application provides a method for updating an operating system, where the method for updating an operating system includes: receiving, by an eUICC, a restart instruction sent by a local profile assistant (LPA) of a terminal device and used to instruct the eUICC to perform a restart operation; sending, by the eUICC to a modem of the terminal device, a first initialization request used to request the modem to control restart of the eUICC; receiving, by the eUICC after being restarted, a plurality of operating system (OS) element data packets that are sequentially sent by the LPA, where the plurality of OS element data packets are slice files of an installation file of a first operating system; parsing, by the eUICC after receiving a part of OS element data packets in the plurality of OS element data packets, the OS element data packets received by the eUICC, and installing the first operating system based on a parsing result; and after installing the first operating system based on a parsing result of a first OS element data packet (that is, any one of the plurality of OS element data packets received by the eUICC), deleting, by the eUICC, the first OS element data packet.

In this application, because the plurality of OS element data packets are obtained by encapsulating slices of a first file, storage space required for storing the part of OS element data packets in the plurality of OS element data packets is smaller than storage space required for storing the first file. Therefore, even if remaining storage space of the eUICC is insufficient for storing the installation file of the first operating system and installing the first operating system, the eUICC may start to parse the received part of OS element data packets when receiving the part of OS element data packets, and start to install the first operating system based on the parsing result, and after installing the first operating system by using a parsing result of an OS element data packet (the first OS element data packet), delete the OS element data packet to reduce occupation of the storage space of the eUICC by the OS element data packet. The first operating system does not need to be installed based on all of the plurality of OS element data packets. Therefore, a problem that due to a limited capacity of storage space of an eUICC, an operating system of the eUICC fails to be updated and the eUICC cannot install a new operating system can be resolved.

With reference to the first aspect, in a first possible implementation, by using an update instruction (such as a first update instruction or a second update instruction) carried in the restart instruction, the LPA may instruct the eUICC to: start to parse the received data packets after receiving the part of OS element data packets in the plurality of OS element data packets, and install the first file ("installing while receiving") based on the parsing result, or start to parse the received data packets only after receiving all of the plurality of OS element data packets, and install the first file based on the parsing result ("installing while receiving"). Regardless of whether the remaining storage space of the eUICC is sufficient for storing the installation file of the first operating system and installing the first operating system, the LPA may instruct, by adding a first update identifier to the restart instruction, the eUICC to perform "installing while receiving". Specifically, the restart instruction may carry the first update instruction, and the first update instruction is used to instruct the eUICC to parse, after receiving the part of OS element data packets, the OS element data packets received by the eUICC and install the first operating system based on the parsing result (that is, installing while receiving).

With reference to the first aspect or the first possible implementation, in a second possible implementation, the LPA may determine whether the remaining storage space of the eUICC is sufficient for storing the installation file of the first operating system and installing the first operating system, and then determine which update instruction (for example, the first update instruction or the second update instruction) is to be carried and sent to the eUICC. In this implementation, before the receiving, by an eUICC, a restart instruction sent by an LPA of a terminal device, the method in this application may further include: sending, by the eUICC, information about a size of the remaining storage space of the eUICC to the LPA, where the remaining storage space of the eUICC is remaining storage space after the eUICC stores a subscription information set and an application and backs up an installation file of a second operating system, and the second operating system is an operating system installed before the eUICC updates the operating system.

The restart instruction carrying the first update instruction is sent by the LPA after the LPA determines, based on the information about the size of the remaining storage space of the eUICC and information about a size of the installation file of the first operating system, that the remaining storage space of the eUICC is insufficient for storing the installation file of the first operating system and installing the first operating system.

With reference to the first aspect or the first possible implementation, in a third possible implementation, the eUICC may determine whether the remaining storage space of the eUICC is sufficient for storing the installation file of the first operating system and installing the first operating system, and then indicate, to the LPA by using indication information (such as first indication information), that the remaining storage space of the eUICC is insufficient for storing the installation file of the first operating system and installing the first operating system, so that the LPA determines to send the restart instruction carrying the first update instruction to the eUICC. Specifically, before the receiving, by an eUICC, a restart instruction sent by an LPA of a terminal device, the method in this application may further include: receiving, by the eUICC, information, sent by the LPA, about a size of the installation file of the first operating system; determining, by the eUICC based on the information about the size of the installation file of the first operating system and information about a size of the remaining storage space of the eUICC, that the remaining storage space of the eUICC is insufficient for storing the installation file of the first operating system and installing the first operating system; and sending, by the eUICC, first indication information to the LPA, where the first indication information is used to indicate that the remaining storage space of the eUICC is insufficient for storing the installation file of the first operating system and installing the first operating system, where the restart instruction carrying the first update instruction is sent by the LPA after the LPA receives the first indication information.

With reference to the first aspect, in a fourth possible implementation, the eUICC itself may determine, based on whether the remaining storage space of the eUICC is sufficient for storing the installation file of the first operating system and installing the first operating system, whether to perform "installing while receiving" or "installing while receiving", instead of being instructed, by the LPA by using the restart instruction carrying the update instruction, to perform "installing while receiving" or "installing while receiving". Therefore, in this implementation, the restart instruction does not carry the first update instruction or the second update instruction. Specifically, the parsing, by the eUICC after receiving a part of OS element data packets in the plurality of OS element data packets, the OS element data packets received by the eUICC, and installing the first operating system based on a parsing result may include: if the remaining storage space of the eUICC is insufficient for storing the installation file of the first operating system and installing the first operating system, parsing, by the eUICC after receiving the part of OS element data packets in the plurality of OS element data packets, the OS element data packets received by the eUICC, and installing the first operating system based on the parsing result.

With reference to the first aspect or the fourth possible implementation, in a fifth possible implementation, the LPA may determine whether the remaining storage space of the eUICC is sufficient for storing the installation file of the first operating system and installing the first operating system. Specifically, before the parsing, by the eUICC after receiving a part of OS element data packets in the plurality of OS element data packets, the OS element data packets received by the eUICC, and installing the first operating system based on a parsing result, the method in this application may further include: sending, by the eUICC, information about a size of the remaining storage space of the eUICC to the LPA; and receiving, by the eUICC, first indication information sent by the LPA, where the first indication information is used to indicate that the remaining storage space of the eUICC is insufficient for storing the installation file of the first operating system and installing the first operating system. The first indication information is sent by the LPA after the LPA determines, based on the information about the size of the remaining storage space of the eUICC and information about a size of the installation file of the first operating system, that the remaining storage space of the eUICC is insufficient for storing the installation file of the first operating system and installing the first operating system.

With reference to the first aspect or the fourth possible implementation, in a sixth possible implementation, the eUICC may determine whether the remaining storage space of the eUICC is sufficient for storing the installation file of the first operating system and installing the first operating system. Specifically, before the parsing, by the eUICC after receiving a part of OS element data packets in the plurality of OS element data packets, the OS element data packets received by the eUICC, and installing the first operating system based on a parsing result, the method in this application may further include: receiving, by the eUICC, information, sent by the LPA, about a size of the installation file of the first operating system; and determining, by the eUICC based on the information about the size of the installation file of the first operating system and information about a size of the remaining storage space of the eUICC, that the remaining storage space of the eUICC is insufficient for storing the installation file of the first operating system and installing the first operating system.

With reference to the first aspect or any one of the foregoing possible implementations, in a seventh possible implementation, the first file obtained by the LPA from an operating system delivery server (ODS) and used to install the first operating system may be an incremental file of the installation file of the first operating system relative to the second operating system, or the first file may be the installation file of the first operating system (that is, a full installation file of the first operating system). When the first file is the incremental file of the installation file of the first operating system relative to the second operating system, the LPA may combine the first file with the installation file of the second operating system to obtain the installation file of the first operating system. Specifically, before the receiving, by the eUICC after being restarted, a plurality of operating system (OS) element data packets that are sequentially sent by the LPA, the method in this application may further include: sending, by the eUICC, the installation file of the second operating system to the LPA.

With reference to the first aspect or any one of the foregoing possible implementations, in an eighth possible implementation, the installation file of the first operating system includes an initialize secure channel (ISC) field, a store metadata for operating system (Store Metadata for COS Image, SMO) field, an operating system key (Image key, OIK) field, and payload information of an installation package of the first operating system, where the initialize secure channel field is used to initialize a secure channel for transmitting the installation file of the first operating system; and the SMO field includes metadata of the first operating system, the metadata of the first operating system includes eUICC manufacturer (EUM) information, information about a size of the first operating system, and version information of the first operating system, and the OIK field is used to encrypt the plurality of OS element data packets.

With reference to the eighth possible implementation, in a ninth possible implementation, the plurality of OS element data packets include an initialize secure channel data packet, an SMO data packet, an OIK data packet, and at least one payload data packet, where the initialize secure channel data packet is obtained by encapsulating the initialize secure channel field, the SMO data packet is obtained by encapsulating the SMO field, the OIK data packet is obtained by encapsulating the OIK field, and the at least one payload data packet is obtained by encapsulating a slice of the payload information of the installation package of the first operating system.

With reference to the first aspect or any one of the foregoing possible implementations, in a tenth possible implementation, before the parsing, by the eUICC after receiving a part of OS element data packets in the plurality of OS element data packets, the OS element data packets received by the eUICC, and installing the first operating system based on a parsing result, the method in this application may further include: backing up, by the eUICC, the installation file of the second operating system. After the eUICC backs up the installation file of the second operating system, if the eUICC fails to install the first operating system, the installation file of the second operating system may be installed based on the backup installation file of the second operating system, so that normal use of the eUICC is not affected.

With reference to the second aspect or any one of the foregoing possible implementations, in an eleventh possible implementation, after the eUICC receives each OS element data packet sent by the LPA, the eUICC may return, to the LPA, a session identifier (Transaction ID) of a session that is negotiated between the LPA and the eUICC for the plurality of OS element data packets; after receiving the transaction ID, the LPA identifies whether the transaction ID is the session identifier of the session for the plurality of OS element data packets; and if yes, which indicates that the plurality of OS element data packets are transmitted in a same remote subscriber identity module (SIM) provisioning (RSP) session, the LPA may continue to send a next OS element data packet to the eUICC; or if no, the LPA may delete the session.

A second aspect of this application provides a method for updating an operating system, where the method for updating an operating system includes: receiving, by an eUICC, a restart instruction sent by an LPA and carrying a second update instruction, where the second update instruction is used to instruct the eUICC to parse a plurality of operating system (OS) element data packets after receiving the plurality of OS element data packets and install a first operating system based on a parsing result, the plurality of OS element data packets are slice files of a first file, and the first file is used to install the first operating system; sending, by the eUICC, a first initialization request to a modem of a terminal device, requesting the modem to control restart of the eUICC; receiving, by the eUICC after being restarted, the plurality of OS element data packets that are sequentially sent by the LPA; parsing, by the eUICC, the plurality of OS element data packets after receiving the plurality of OS element data packets, and installing the first operating system based on the parsing result; and after installing the first operating system based on a parsing result of a first OS element data packet (that is, any one of the plurality of OS element data packets received by the eUICC), deleting, by the eUICC, the first OS element data packet. After the eUICC receives the plurality of operating system (OS) element data packets, the eUICC may parse the plurality of OS element data packets based on the instruction of the LPA, and install the first operating system based on the parsing result.

With reference to the second aspect, in a first possible implementation, the LPA may determine whether remaining storage space of the eUICC is sufficient for storing an installation file of the first operating system and installing the first operating system, and then determine which update instruction (for example, a first update instruction or the second update instruction) is to be carried and sent to the eUICC. In this implementation, before the receiving, by an eUICC, a restart instruction sent by an LPA of a terminal device, the method in this application may further include: sending, by the eUICC, information about a size of the remaining storage space of the eUICC to the LPA, where the remaining storage space of the eUICC is remaining storage space after the eUICC stores a subscription information set and an application and backs up an installation file of a second operating system, and the second operating system is an operating system installed before the eUICC updates the operating system.

The restart instruction carrying the second update instruction is sent by the LPA after the LPA determines, based on the information about the size of the remaining storage space of the eUICC and information about a size of the installation file of the first operating system, that the remaining storage space of the eUICC is sufficient for storing the installation file of the first operating system and installing the first operating system.

With reference to the second aspect, in a second possible implementation, the eUICC may determine whether remaining storage space of the eUICC is sufficient for storing an installation file of the first operating system and installing the first operating system, and then indicate, to the LPA by using indication information (such as second indication information), that the remaining storage space of the eUICC is sufficient for storing the installation file of the first operating system and installing the first operating system, so that the LPA determines to send the restart instruction carrying the second update instruction to the eUICC. Specifically, before the receiving, by an eUICC, a restart instruction sent by an LPA of a terminal device, the method in this application may further include: receiving, by the eUICC, information, sent by the LPA, about a size of the installation file of the first operating system; determining, by the eUICC based on the information about the size of the installation file of the first operating system and information about a size of the remaining storage space of the eUICC, that the remaining storage space of the eUICC is sufficient for storing the installation file of the first operating system and installing the first operating system; and sending, by the eUICC, the second indication information to the LPA, where the second indication information is used to indicate that the remaining storage space of the eUICC is sufficient for storing the installation file of the first operating system and installing the first operating system. The restart instruction carrying the second update instruction is sent by the LPA after the LPA receives the second indication information.

With reference to the second aspect or either of the foregoing possible implementations, in a third possible implementation, the first file is the installation file of the first operating system. In this implementation, a second file received by the LPA from an ODS may be the first file (that is, the installation file of the first operating system). Alternatively, a second file received by the LPA from an ODS may be an incremental file of the installation file of the first operating system relative to the installation file of the second operating system, and the eUICC combines the second file with the incremental file to obtain the first file.

With reference to the second possible implementation, in a fourth possible implementation, when a second file received by the LPA from an ODS is an incremental file of the installation file of the first operating system relative to the installation file of the second operating system, before the sending, by the eUICC, a first initialization request to a modem of a terminal device, the method in this application may further include: sending, by the eUICC, the installation file of the second operating system to the LPA.

With reference to the second aspect or any one of the foregoing possible implementations, in a fifth possible implementation, the first file is an incremental file of the first operating system relative to the second operating system. In this implementation, the eUICC may combine the plurality of OS element data packets with the installation file of the second operating system to obtain the installation file of the first operating system. Specifically, the parsing, by the eUICC, the plurality of OS element data packets after receiving the plurality of OS element data packets, and installing the first operating system based on the parsing result may include: after receiving the plurality of OS element data packets, combining, by the eUICC, the plurality of OS element data packets with the installation file of the second operating system to obtain the installation file of the first operating system; and parsing, by the eUICC, the installation file of the first operating system, and installing the first operating system based on the parsing result.

A third aspect of this application provides a method for updating an operating system, where the method for updating an operating system includes: receiving, by an eUICC, a restart instruction sent by an LPA of a terminal device; sending, by the eUICC, a first initialization request to a modem of the terminal device, where the first initialization request is used to request the modem to control restart of the eUICC; receiving, by the eUICC after being restarted, a plurality of OS element data packets that are sequentially sent by the LPA, where the plurality of OS element data packets are slice files of a first file, and the first file is used to install a first operating system; if remaining storage space of the eUICC is sufficient for storing an installation file of the first operating system and installing the first operating system, parsing, by the eUICC, the plurality of OS element data packets after receiving the plurality of OS element data packets, and installing the first operating system based on a parsing result; and after installing the first operating system based on a parsing result of a first OS element data packet (that is, any one of the plurality of OS element data packets received by the eUICC), deleting, by the eUICC, the first OS element data packet.

With reference to the third aspect, in a first possible implementation, the LPA may determine whether the remaining storage space of the eUICC is sufficient for storing the installation file of the first operating system and installing the first operating system, and then determine which update instruction (for example, a first update instruction or a second update instruction) is to be carried and sent to the eUICC. In this implementation, before the parsing, by the eUICC, the plurality of OS element data packets after receiving the plurality of OS element data packets, and installing the first operating system based on a parsing result if remaining storage space of the eUICC is sufficient for storing an installation file of the first operating system and installing the first operating system, the method in this application may further include: sending, by the eUICC, information about a size of the remaining storage space of the eUICC to the LPA; and receiving, by the eUICC, second indication information sent by the LPA, where the second indication information is used to indicate that the remaining storage space of the eUICC is insufficient for storing the installation file of the first operating system and installing the first operating system, where the second indication information is sent by the LPA after the LPA determines, based on the information about the size of the remaining storage space of the eUICC and information about a size of the installation file of the first operating system, that the remaining storage space of the eUICC is sufficient for storing the installation file of the first operating system and installing the first operating system.

With reference to the third aspect, in a first possible implementation, the eUICC may determine whether the remaining storage space of the eUICC is sufficient for storing the installation file of the first operating system and installing the first operating system, and then determine which update instruction (for example, a first update instruction or a second update instruction) is to be carried and sent to the eUICC. In this implementation, before the parsing, by the eUICC, the plurality of OS element data packets after receiving the plurality of OS element data packets, and installing the first operating system based on a parsing result if remaining storage space of the eUICC is sufficient for storing an installation file of the first operating system and installing the first operating system, the method in this application may further include: receiving, by the eUICC, information, sent by the LPA, about a size of the installation file of the first operating system; and determining, by the eUICC based on the information about the size of the installation file of the first operating system and information about a size of the remaining storage space of the eUICC, that the remaining storage space of the eUICC is sufficient for storing the installation file of the first operating system and installing the first operating system.

With reference to the first aspect, the second aspect, or the third aspect, and any possible implementation thereof, in another possible implementation, after installing the first operating system, the eUICC may send a second initialization request to the modem, requesting the modem to register the eUICC with a network device. After the eUICC installs the new operating system, the eUICC can access a network only after being registered with the network device.

With reference to the first aspect, the second aspect, or the third aspect, and any possible implementation thereof, in another possible implementation, the receiving, by the eUICC after being restarted, the plurality of OS element data packets that are sequentially sent by the LPA may include: receiving, by the eUICC after being restarted, a plurality of type length data (Type length Value, TLV) data packets that are sequentially sent by the LPA. To be specific, the plurality of OS element data packets may be specifically a plurality of TLV data packets.

With reference to the first aspect, the second aspect, or the third aspect, and any possible implementation thereof, in another possible implementation, the receiving, by the eUICC after being restarted, a plurality of TLV data packets that are sequentially sent by the LPA may include: receiving, by the eUICC after being restarted, a plurality of application protocol data unit (Application Data Unit, APDU) commands that are sequentially sent by the LPA, where a TLV data packet is encapsulated in each APDU command in the plurality of APDUs.

A fourth aspect of this application provides a method for updating an operating system, where the method for updating an operating system includes: encapsulating, by an LPA of a terminal device, slices of a first file to obtain a plurality of operating system (OS) element data packets, where the first file is used to install a first operating system of an eUICC of the terminal device; sending, by the LPA, a restart instruction to the eUICC, where the restart instruction is used to instruct the eUICC to perform a restart operation to install the first operating system after the eUICC receives the plurality of OS element data packets; and sequentially sending, by the LPA, the plurality of OS element data packets to the eUICC.

In this application, because the plurality of OS element data packets are obtained by encapsulating the slices of the first file, storage space required for storing a part of OS element data packets in the plurality of OS element data packets is smaller than storage space required for storing the first file. Therefore, even if remaining storage space of the eUICC is insufficient for storing an installation file of the first operating system and installing the first operating system, because the LPA sequentially sends the plurality of OS element data packets to the eUICC, the eUICC may start to parse the received part of OS element data packets when receiving the part of OS element data packets, and start to install the first operating system based on a parsing result, and after installing the first operating system by using a parsing result of an OS element data packet (a first OS element data packet), delete the OS element data packet to reduce occupation of the storage space of the eUICC by the OS element data packet. The first operating system does not need to be installed based on all of the plurality of OS element data packets. Therefore, a problem that due to a limited capacity of storage space of an eUICC, an operating system of the eUICC fails to be updated and the eUICC cannot install a new operating system can be resolved.

With reference to the fourth aspect, in a first possible implementation, the first file is the installation file of the first operating system; or the first file is an incremental file of the first operating system relative to a second operating system. In this implementation, before the encapsulating, by an LPA, slices of a first file to obtain a plurality of operating system (OS) element data packets, the method in this application may further include: establishing, by the LPA, an eUICC operating system update session with an ODS; and obtaining, by the LPA, the first file from the ODS by using the eUICC operating system update session.

With reference to the fourth aspect, in a second possible implementation, the first file is the installation file of the first operating system, but a second file obtained by the LPA from an ODS is an incremental file of the first operating system relative to a second operating system. In this implementation, before the encapsulating, by an LPA, slices of a first file to obtain a plurality of operating system (OS) element data packets, the method in this application may further include: establishing, by the LPA, an eUICC operating system update session with the ODS; obtaining, by the LPA, the second file from the ODS by using the eUICC operating system update session; receiving, by the LPA, an installation file of the second operating system that is sent by the eUICC; and combining, by the LPA, the installation file of the second operating system with the second file to obtain the first file.

With reference to the fourth aspect or either of the foregoing possible implementations, in a third possible implementation, by using an update instruction (such as a first update instruction or a second update instruction) carried in the restart instruction, the LPA may instruct the eUICC to: start to parse the received data packets after receiving the part of OS element data packets in the plurality of OS element data packets, and install the first file ("installing while receiving") based on the parsing result, or start to parse the received data packets only after receiving all of the plurality of OS element data packets, and install the first file based on a parsing result ("installing while receiving").

With reference to the third possible implementation of the fourth aspect, in a fourth possible implementation, the LPA may determine whether the remaining storage space of the eUICC is sufficient for storing the installation file of the first operating system and installing the first operating system. Specifically, before the sending, by the LPA, a restart instruction to the eUICC, the method in this application may further include: receiving, by the LPA, information sent by the eUICC about a size of the remaining storage space of the eUICC; and determining, by the LPA based on the information about the size of the remaining storage space of the eUICC and information about a size of the installation file of the first operating system, whether the remaining storage space of the eUICC is sufficient for storing the installation file of the first operating system and installing the first operating system. Correspondingly, the sending, by the LPA, a restart instruction to the eUICC may include: if the remaining storage space of the eUICC is insufficient for storing the installation file of the first operating system and installing the first operating system, sending, by the LPA, the restart instruction carrying the first update instruction to the eUICC; or if the remaining storage space of the eUICC is sufficient for storing the installation file of the first operating system and installing the first operating system, sending, by the LPA, the restart instruction carrying the second update instruction to the eUICC.

With reference to the third possible implementation of the fourth aspect, in a fifth possible implementation, the eUICC may determine whether the remaining storage space of the eUICC is sufficient for storing the installation file of the first operating system and installing the first operating system. Specifically, before the sending, by the LPA, a restart instruction to the eUICC, the method in this application may further include: sending, by the LPA, information about a size of the installation file of the first operating system to the eUICC; and if the LPA receives first indication information sent by the eUICC, sending, by the LPA, the restart instruction carrying the first update instruction to the eUICC; or if the LPA receives second indication information sent by the eUICC, sending, by the LPA, the restart instruction carrying the second update instruction to the eUICC.

With reference to the fourth aspect, or the first or the second possible implementation of the fourth aspect, in a sixth possible implementation, the eUICC itself may determine, based on whether the remaining storage space of the eUICC is sufficient for storing the installation file of the first operating system and installing the first operating system, whether to perform "installing while receiving" or "installing while receiving", instead of being instructed, by the LPA by using the restart instruction carrying the update instruction, to perform "installing while receiving" or "installing while receiving".

With reference to the sixth possible implementation of the fourth aspect, in a seventh possible implementation, the LPA may determine whether the remaining storage space of the eUICC is sufficient for storing the installation file of the first operating system and installing the first operating system. Specifically, before the sequentially sending, by the LPA, the plurality of OS element data packets to the eUICC, the method in this application may further include: receiving, by the LPA, information sent by the eUICC about a size of the remaining storage space of the eUICC; determining, by the LPA based on the information about the size of the remaining storage space of the eUICC and information about a size of the installation file of the first operating system, whether the remaining storage space of the eUICC is sufficient for storing the installation file of the first operating system and installing the first operating system; and if the remaining storage space of the eUICC is insufficient for storing the installation file of the first operating system and installing the first operating system, sending, by the LPA, first indication information to the eUICC; or if the remaining storage space of the eUICC is sufficient for storing the installation file of the first operating system and installing the first operating system, sending, by the LPA, second indication information to the eUICC.

With reference to the sixth possible implementation of the fourth aspect, in a seventh possible implementation, the eUICC may determine whether the remaining storage space of the eUICC is sufficient for storing the installation file of the first operating system and installing the first operating system. Specifically, before the sequentially sending, by the LPA, the plurality of OS element data packets to the eUICC, the LPA sends information about a size of the installation file of the first operating system to the eUICC.

With reference to the fourth aspect or any one of the foregoing possible implementations, in an eighth possible implementation, after the LPA sends the OS element data packets to the eUICC, the method in this application may further include: receiving, by the LPA, a session identifier (Transaction ID) sent by the eUICC, where the transaction ID is a session identifier of a session that is negotiated between the LPA and the eUICC for the plurality of OS element data packets; after receiving the transaction ID, identifying, by the LPA, whether the transaction ID is the session identifier of the session for the plurality of OS element data packets; and if yes, which indicates that the plurality of OS element data packets are transmitted in a same RSP session, continuing to send a next OS element data packet to the eUICC; or if no, deleting, by the LPA, the session.

A fifth aspect of this application provides a method for updating an operating system, where the method for updating an operating system includes: backing up, by an eUICC, an installation file of a second operating system; if remaining storage space of the eUICC is insufficient for storing an installation file of a first operating system and installing the first operating system, sending, by the eUICC, the installation file of the second operating system to an LPA of a terminal device, and deleting the installation file of the second operating system that is stored in the eUICC; receiving, by the eUICC, a first file sent by the LPA; and installing, by the eUICC after being restarted, the first operating system based on the first file.

In this application, the LPA may store the backup installation file of the second operating system. Therefore, even if the eUICC determines that the remaining storage space of the eUICC is insufficient for storing the installation file of the first operating system and installing a first COS, because the eUICC does not need to store the backup installation file of the second operating system, a possibility that the eUICC cannot install the new operating system because the operating system of the eUICC fails to be updated due to a limited capacity of the storage space of the eUICC can be reduced.

With reference to the fifth aspect, in a first possible implementation, the LPA may determine whether the remaining storage space of the eUICC is sufficient for storing the installation file of the first operating system and installing the first operating system. For a specific method for determining, by the LPA, whether the remaining storage space of the eUICC is sufficient for storing the installation file of the first operating system and installing the first operating system, refer to related descriptions in the first aspect to the fourth aspect and possible implementations thereof. Details are not described again herein in this application.

With reference to the fifth aspect, in a second possible implementation, the eUICC may determine whether the remaining storage space of the eUICC is sufficient for storing the installation file of the first operating system and installing the first operating system. For a specific method for determining, by the eUICC, whether the remaining storage space of the eUICC is sufficient for storing the installation file of the first operating system and installing the first operating system, refer to related descriptions in the first aspect to the fourth aspect and possible implementations thereof. Details are not described again herein in this application.

With reference to the fifth aspect or either of the foregoing possible implementations, in a third possible implementation, the first file is an incremental file of the first operating system relative to the second operating system. The installing, by the eUICC after being restarted, the first operating system based on the first file may include: combining, by the eUICC after being restarted, the first file with the installation file of the second operating system to obtain the installation file of the first operating system; and installing, by the eUICC, the first operating system based on the installation file of the first operating system.

With reference to the fifth aspect and any one of the foregoing possible implementations, in a fourth possible implementation, to reduce occupation of the storage space of the eUICC by the installation file of the first operating system, the method in this application may further include: deleting, by the eUICC after installing the first operating system, the installation file of the first operating system.

A sixth aspect of this application provides an eUICC, where the eUICC includes a receiving module, a sending module, an installation module, and a deletion module. The receiving module is configured to receive a restart instruction sent by an LPA of a terminal device and used to instruct the eUICC to perform a restart operation; the sending module is configured to send a first initialization request to a modem of the terminal device, where the first initialization request is used to request the modem to control restart of the eUICC; the receiving module is further configured to receive, after the restart, a plurality of OS element data packets that are sequentially sent by the LPA, where the plurality of OS element data packets are slice files of an installation file of a first operating system; the installation module is configured to parse, after the receiving module receives a part of OS element data packets in the plurality of OS element data packets, the OS element data packets received by the receiving module, and install the first operating system based on a parsing result; and the deletion module is configured to delete a first OS element data packet after the installation module installs the first operating system based on a parsing result of the first OS element data packet, where the first OS element data packet is any OS element data packet received by the receiving module.

With reference to the sixth aspect, in a first possible implementation, the restart instruction carries a first update instruction, and the first update instruction is used to instruct the eUICC to parse, after receiving the part of OS element data packets, the OS element data packets received by the receiving module, and install the first operating system based on the parsing result.

With reference to the first possible implementation of the sixth aspect, in a second possible implementation, the sending module is further configured to send information about a size of remaining storage space of the eUICC to the LPA before the receiving module receives the restart instruction sent by the LPA, where the remaining storage space of the eUICC is remaining storage space after the eUICC stores a subscription information set and an application and backs up an installation file of a second operating system, and the second operating system is an operating system installed before the eUICC updates the operating system.

With reference to the first possible implementation of the sixth aspect, in a third possible implementation, the receiving module is further configured to receive, before receiving the restart instruction sent by the LPA, information, sent by the LPA, about a size of the installation file of the first operating system; the eUICC may further include a determining module, where the determining module is configured to determine, based on the information about the size of the installation file of the first operating system that is received by the receiving module and information about a size of remaining storage space of the eUICC, that the remaining storage space of the eUICC is insufficient for storing the installation file of the first operating system and installing the first operating system; and the sending module is further configured to send first indication information to the LPA, where the first indication information is used to indicate that the remaining storage space of the eUICC is insufficient for storing the installation file of the first operating system and installing the first operating system.

With reference to the first possible implementation of the sixth aspect, in a fourth possible implementation, the installation module is specifically configured to: if remaining storage space of the eUICC is insufficient for storing the installation file of the first operating system and installing the first operating system, after the eUICC receives the part of OS element data packets in the plurality of OS element data packets, parse the OS element data packets received by the receiving module, and install the first operating system based on the parsing result.

With reference to the fourth possible implementation of the sixth aspect, in a fifth possible implementation, the sending module is further configured to send information about a size of the remaining storage space of the eUICC to the LPA before the installation module parses the OS element data packets received by the receiving module and installs the first operating system based on the parsing result; and the receiving module is further configured to receive first indication information sent by the LPA, where the first indication information is used to indicate that the remaining storage space of the eUICC is insufficient for storing the installation file of the first operating system and installing the first operating system.

With reference to the fourth possible implementation of the sixth aspect, in a sixth possible implementation, before the installation module parses the OS element data packets received by the receiving module and installs the first operating system based on the parsing result, the receiving module is further configured to receive information, sent by the LPA, about a size of the installation file of the first operating system; and a determining module is configured to determine, based on the information about the size of the installation file of the first operating system that is received by the receiving module and information about a size of the remaining storage space of the eUICC, that the remaining storage space of the eUICC is insufficient for storing the installation file of the first operating system and installing the first operating system.

With reference to the sixth aspect or any possible implementation of the sixth aspect, in a sixth possible implementation, before the receiving module receives, after the restart, the plurality of operating system (OS) element data packets that are sequentially sent by the LPA, the sending module is further configured to send the installation file of the second operating system to the LPA, where the second operating system is the operating system installed before the eUICC updates the operating system.

A seventh aspect of this application provides an eUICC, where the eUICC includes a receiving module, a sending module, an installation module, and a deletion module. The receiving module is configured to receive a restart instruction sent by a local profile assistant LPA of a terminal device, where the restart instruction carries a second update instruction, the second update instruction is used to instruct the eUICC to parse a plurality of operating system (OS) element data packets after receiving the plurality of OS element data packets and install a first operating system based on a parsing result, the plurality of OS element data packets are slice files of a first file, and the first file is used to install the first operating system; the sending module is configured to send a first initialization request to a modem of the terminal device; the receiving module is further configured to receive, after the eUICC is restarted, the plurality of OS element data packets that are sequentially sent by the LPA; the installation module is configured to parse the plurality of OS element data packets after the receiving module receives the plurality of OS element data packets, and install the first operating system based on the parsing result; and the deletion module is configured to delete a first OS element data packet after the installation module installs the first operating system based on a parsing result of the first OS element data packet, where the first OS element data packet is any OS element data packet received by the receiving module.

With reference to the seventh aspect, in a first possible implementation, before the receiving module receives the restart instruction sent by the LPA of the terminal device, the sending module is further configured to send information about a size of remaining storage space of the eUICC to the LPA, where the remaining storage space of the eUICC is remaining storage space after the eUICC stores a subscription information set and an application and backs up an installation file of a second operating system, and the second operating system is an operating system installed before the eUICC updates the operating system.

With reference to the seventh aspect, in a second possible implementation, the receiving module is further configured to receive, before receiving the restart instruction sent by the LPA, information, sent by the LPA, about a size of an installation file of the first operating system; a determining module is configured to determine, based on the information about the size of the installation file of the first operating system that is received by the receiving module and information about a size of remaining storage space of the eUICC, that the remaining storage space of the eUICC is insufficient for storing the installation file of the first operating system and installing the first operating system; and the sending module is further configured to send second indication information to the LPA, where the second indication information is used to indicate that the remaining storage space of the eUICC is insufficient for storing the installation file of the first operating system and installing the first operating system.

With reference to the seventh aspect or either of the foregoing possible implementations, in a third possible implementation, the first file is the installation file of the first operating system.

With reference to the third possible implementation of the seventh aspect, in a fourth possible implementation, the sending module is further configured to send the installation file of the second operating system to the LPA before sending the first initialization request to the modem, where the second operating system is the operating system installed before the eUICC updates the operating system.

With reference to the seventh aspect or any one of the foregoing possible implementations, in a fifth possible implementation, the first file is an incremental file of the first operating system relative to the second operating system, and the second operating system is the operating system installed before the eUICC updates the operating system; and the installation module is specifically configured to: after the receiving module receives the plurality of OS element data packets, combine the plurality of OS element data packets with the installation file of the second operating system to obtain the installation file of the first operating system; and parse the installation file of the first operating system, and install the first operating system based on the parsing result.

An eighth aspect of this application provides an eUICC, where the eUICC includes a receiving module, a sending module, an installation module, and a deletion module. The receiving module is configured to receive a restart instruction sent by an LPA of a terminal device; the sending module is configured to send a first initialization request to a modem of the terminal device; the receiving module is further configured to receive, after the eUICC is restarted, a plurality of operating system (OS) element data packets that are sequentially sent by the LPA, where the plurality of OS element data packets are slice files of a first file, and the first file is used to install a first operating system; the installation module is configured to: if remaining storage space of the eUICC is sufficient for storing an installation file of the first operating system and installing the first operating system, parse the plurality of OS element data packets after the receiving module receives the plurality of OS element data packets, and install the first operating system based on a parsing result, where the remaining storage space of the eUICC is remaining storage space after the eUICC stores a subscription information set and an application and backs up an installation file of a second operating system, and the second operating system is an operating system installed before the eUICC updates the operating system; and the deletion module is configured to delete a first OS element data packet after the installation module installs the first operating system based on a parsing result of the first OS element data packet, where the first OS element data packet is any OS element data packet received by the receiving module.

With reference to the eighth aspect, in a first possible implementation, before the installation module parses the plurality of OS element data packets after the eUICC receives the plurality of OS element data packets, and installs the first operating system based on the parsing result if the remaining storage space of the eUICC is sufficient for storing the installation file of the first operating system and installing the first operating system, the sending module is further configured to send information about a size of the remaining storage space of the eUICC to the LPA; and the receiving module is configured to receive second indication information sent by the LPA, where the first indication information is used to indicate that the remaining storage space of the eUICC is insufficient for storing the installation file of the first operating system and installing the first operating system.

With reference to the eighth aspect, in a second possible implementation, before the installation module parses the plurality of OS element data packets after the eUICC receives the plurality of OS element data packets, and installs the first operating system based on the parsing result if the remaining storage space of the eUICC is sufficient for storing the installation file of the first operating system and installing the first operating system, the receiving module is further configured to receive information, sent by the LPA, about a size of the installation file of the first operating system; and the eUICC may further include a determining module, where the determining module is configured to determine, based on the information about the size of the installation file of the first operating system that is received by the receiving module and information about a size of the remaining storage space of the eUICC, that the remaining storage space of the eUICC is sufficient for storing the installation file of the first operating system and installing the first operating system.

A ninth aspect of this application provides an LPA, where the LPA includes a slice encapsulation module and a sending module. The slice encapsulation module is configured to encapsulate slices of a first file to obtain a plurality of operating system (OS) element data packets, where the first file is used to install a first operating system of an embedded universal integrated circuit card eUICC of a terminal device; the sending module is configured to send a restart instruction to the eUICC, where the restart instruction is used to instruct the eUICC to perform a restart operation to install the first operating system after the eUICC receives the plurality of OS element data packets; and the sending module is further configured to sequentially send the plurality of OS element data packets to the eUICC.

With reference to the ninth aspect, in a first possible implementation, the first file is an installation file of the first operating system; or the first file is an incremental file of the first operating system relative to a second operating system, and the second operating system is an operating system installed before the eUICC updates the operating system. In this implementation, the eUICC may further include a session establishment module and an obtaining module, where the session establishment module is configured to establish an eUICC operating system update session with an operating system delivery server (ODS) before the slice encapsulation module encapsulates the slices of the first file to obtain the plurality of operating system (OS) element data packets; and the obtaining module is configured to obtain the first file from the ODS by using the eUICC operating system update session established by the session establishment module.

With reference to the ninth aspect, in a second possible implementation, the first file is an installation file of the first operating system. In this implementation, the eUICC may further include a session establishment module, an obtaining module, a receiving module, and a combining module, where the session establishment module is configured to establish an eUICC operating system update session with an operating system delivery server (ODS) before the slice encapsulation module encapsulates the slices of the first file to obtain the plurality of operating system (OS) element data packets; the obtaining module is configured to obtain a second file from the ODS by using the eUICC operating system update session established by the session establishment module, where the second file is an incremental file of the first operating system relative to a second operating system, and the second operating system is an operating system installed before the eUICC updates the operating system; the receiving module is further configured to receive an installation file of the second operating system that is sent by the eUICC; and the combining module is configured to combine the installation file of the second operating system with the second file to obtain the first file.

With reference to the ninth aspect or either of the foregoing possible implementations, in a third possible implementation, before the sending module sends the restart instruction to the eUICC, the receiving module is configured to receive information sent by the eUICC about a size of remaining storage space of the eUICC, where the remaining storage space of the eUICC is remaining storage space after the eUICC stores a subscription information set and an application and backs up the installation file of the second operating system, and the second operating system is the operating system installed before the eUICC updates the operating system; the LPA further includes a determining module, where the determining module is configured to determine, based on the information about the size of the remaining storage space of the eUICC and information about a size of the installation file of the first operating system, whether the remaining storage space of the eUICC is sufficient for storing the installation file of the first operating system and installing the first operating system; and the sending module is specifically configured to: if the determining module determines that the remaining storage space of the eUICC is insufficient for storing the installation file of the first operating system and installing the first operating system, send the restart instruction carrying a first update instruction to the eUICC, where the first update instruction is used to instruct the eUICC to parse, after the eUICC receives a part of OS element data packets in the plurality of OS element data packets, the OS element data packets received by the eUICC and install the first operating system based on a parsing result; or if the determining module determines that the remaining storage space of the eUICC is sufficient for storing the installation file of the first operating system and installing the first operating system, send the restart instruction carrying a second update instruction to the eUICC, where the second update instruction is used to instruct the eUICC to parse the plurality of OS element data packets after the eUICC receives the plurality of OS element data packets and install the first operating system based on a parsing result.

With reference to the ninth aspect or any one of the foregoing possible implementations, in a fourth possible implementation, before sending the restart instruction to the eUICC, the sending module is further configured to send information about a size of the installation file of the first operating system to the eUICC; the receiving module is further configured to receive first indication information or second indication information sent by the eUICC, where the first indication information is used to indicate that remaining storage space of the eUICC is insufficient for storing the installation file of the first operating system and installing the first operating system, and the second indication information is used to indicate that the remaining storage space of the eUICC is sufficient for storing the installation file of the first operating system and installing the first operating system; and the sending module is further configured to: if the receiving module receives the first indication information sent by the eUICC, send the restart instruction carrying a first update instruction to the eUICC, where the first update instruction is used to instruct the eUICC to parse, after the eUICC receives a part of OS element data packets in the plurality of OS element data packets, the OS element data packets received by the eUICC and install the first operating system based on a parsing result; or if the receiving module receives the second indication information sent by the eUICC, send the restart instruction carrying a second update instruction to the eUICC, where the second update instruction is used to instruct the eUICC to parse the plurality of OS element data packets after the eUICC receives the plurality of OS element data packets and install the first operating system based on a parsing result.

With reference to the ninth aspect, or the first or the second possible implementation of the ninth aspect, in a fifth possible implementation, before the sending module sequentially sends the plurality of OS element data packets to the eUICC, the receiving module is further configured to receive information sent by the eUICC about a size of remaining storage space of the eUICC, where the remaining storage space of the eUICC is remaining storage space after the eUICC stores a subscription information set and an application and backs up the installation file of the second operating system, and the second operating system is the operating system installed before the eUICC updates the operating system; a determining module is configured to determine, based on the information about the size of the remaining storage space of the eUICC that is received by the receiving module and information about a size of the installation file of the first operating system, whether the remaining storage space of the eUICC is sufficient for storing the installation file of the first operating system and installing the first operating system; and the sending module is further configured to: if the determining module determines that the remaining storage space of the eUICC is insufficient for storing the installation file of the first operating system and installing the first operating system, send, by the LPA, first indication information to the eUICC, where the first indication information is used to indicate that the remaining storage space of the eUICC is insufficient for storing the installation file of the first operating system and installing the first operating system; or if the determining module determines that the remaining storage space of the eUICC is sufficient for storing the installation file of the first operating system and installing the first operating system, send, by the LPA, second indication information to the eUICC, where the second indication information is used to indicate that the remaining storage space of the eUICC is sufficient for storing the installation file of the first operating system and installing the first operating system.

With reference to the ninth aspect, or the first or the second possible implementation of the ninth aspect, in a sixth possible implementation, before sending the plurality of OS element data packets to the eUICC, the sending module is further configured to send information about a size of the installation file of the first operating system to the eUICC.

A tenth aspect of this application provides an eUICC, where the eUICC includes a backup module, a sending module, a deletion module, a receiving module, and an installation module. The backup module is configured to back up an installation file of a second operating system, where the second operating system is an operating system installed before the eUICC updates the operating system; the sending module is configured to send the installation file of the second operating system to a local profile assistant LPA of a terminal device if remaining storage space of the eUICC is insufficient for storing an installation file of a first operating system and installing the first operating system; the deletion module is configured to delete the installation file of the second operating system that is stored in the eUICC, where the remaining storage space of the eUICC is remaining storage space after the eUICC stores a subscription information set and an application and backs up the installation file of the second operating system; the receiving module is configured to receive a first file sent by the LPA, where the first file is an installation file used to install the first operating system; and the installation module is configured to install, after restart, the first operating system based on the first file.

With reference to the tenth aspect, in a possible implementation, the first file is an incremental file of the first operating system relative to the second operating system; and the installation module is specifically configured to: after the eUICC is restarted, combine the first file with the installation file of the second operating system to obtain the installation file of the first operating system; and install the first operating system based on the installation file of the first operating system.

With reference to the tenth aspect or the first possible implementation of the tenth aspect, in a second possible implementation, after the installation module installs the first operating system, the deletion module is further configured to delete the installation file of the first operating system.

For detailed descriptions about the first indication information, the second indication information, the first update instruction, the second update instruction, the second operating system, the remaining storage space of the eUICC, and the like in the second aspect to the tenth aspect of this application, refer to the detailed descriptions in the first aspect and the possible implementations of the first aspect. Details are not described again herein in this application.

An eleventh aspect of this application provides an eUICC, where the eUICC includes a processor, a memory, and a communications interface. The processor, the memory, and the communications interface are connected by using a bus, the memory is configured to store computer program code, the computer program code includes an instruction, and when the processor executes the instruction, the eUICC performs the method for updating an operating system according to the first aspect, the second aspect, the third aspect, the fifth aspect, or any possible implementation thereof in this application.

A twelfth aspect of this application provides a computer storage medium, where the computer storage medium stores computer program code, the computer program code includes an instruction, and when a processor of an eUICC executes the instruction, the eUICC performs the method for updating an operating system according to the first aspect, the second aspect, the third aspect, the fifth aspect, or any possible implementation thereof in this application.

A thirteenth aspect of this application provides an LPA, where the LPA includes a processor, a memory, and a communications interface. The processor, the memory, and the communications interface are connected by using a bus, the memory is configured to store computer program code, the computer program code includes an instruction, and when the processor executes the instruction, the LPA performs the method for updating an operating system according to the fourth aspect and any possible implementation of the fourth aspect in this application.

A fourteenth aspect of this application provides a computer storage medium, where the computer storage medium stores computer program code, the computer program code includes an instruction, and when a processor of an LPA executes the instruction, the LPA performs the method for updating an operating system according to the fourth aspect and any possible implementation of the fourth aspect in this application.

A fifteenth aspect of this application provides a terminal device, where the terminal device includes the eUICC according to the thirteenth aspect of this application and the LPA according to the fourteenth aspect of this application.

DESCRIPTION OF EMBODIMENTS

In the specification and accompanying drawings of the present invention, the terms "first", "second", and so on are intended to distinguish between different objects or distinguish between different processing of a same object but are not intended to describe a specific order of the objects. For example, a first operating system and a second operating system may be different operating systems.

A method for updating an operating system according to an embodiment of the present invention may be applied to a process of updating an operating system of an eUICC, and can resolve a problem that due to a limited capacity of storage space of the eUICC, the operating system of the eUICC fails to be updated and the eUICC cannot install a new operating system.

Figure 1:
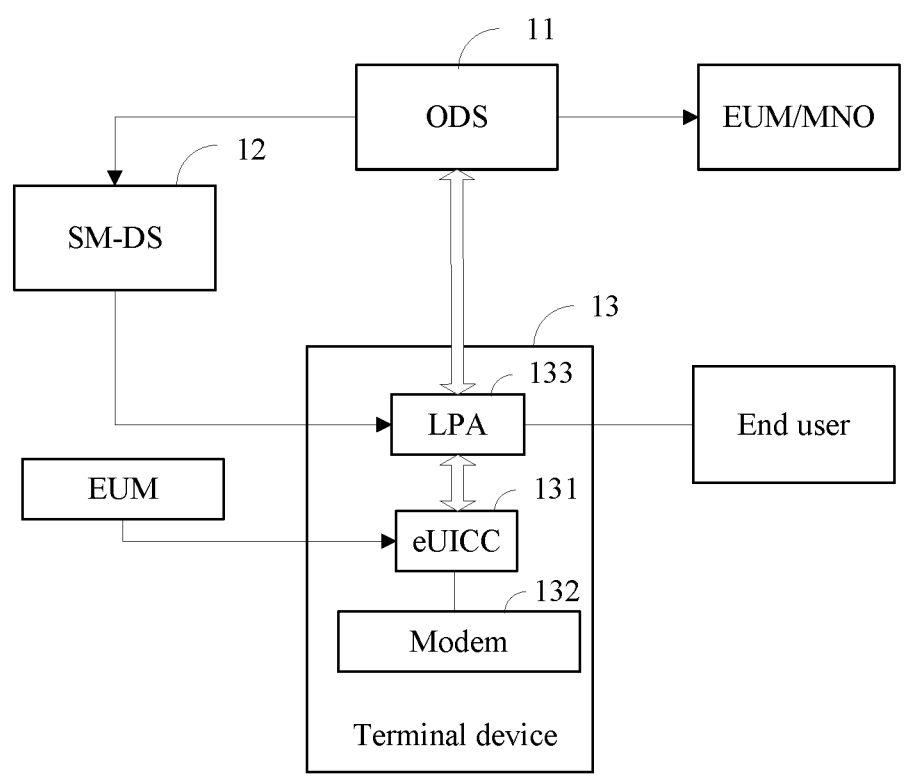
FIG. 1 is a schematic diagram of a network architecture of a communications network to which a method for updating an operating system is applied according to an embodiment of the present invention.

FIG. 1 is a schematic diagram of a network architecture of a communications network to which a method for updating an operating system is applied according to an embodiment of the present invention. As shown in FIG. 1, the communications network may include an ODS 11, a subscription manager-service discovery server (SM-DS) 12, and a terminal device 13. An eUICC 131 and a local profile assistant (LPA) 133 are installed in the terminal device 13. The terminal device 13 may further include a modem chip 132, and the modem chip 132 may be a baseband chip of the terminal device 13.

The ODS 11 may be configured to generate a first file used to install a first operating system (that is, an updated operating system), where the first file may be an installation file of the first operating system, or the first file may be an incremental file of the first operating system relative to a second operating system. The second operating system is an operating system installed before the eUICC updates the operating system. The first file is sent to the LPA 133 of the terminal device 13 by using the SM-DS 12. The LPA 133 of the terminal device 13 may send the first file received by the LPA 133 to the eUICC 131, so that the eUICC 131 can install the first operating system based on the first file, to update a card operating system of the eUICC 131.

The modem chip 132 may be configured to initialize the eUICC 131, control restart of the eUICC 131, and control the eUICC 131 to enter an installation mode after the restart, to install the first operating system. The modem chip 132 may be further configured to restart the eUICC 131, to reinitiate a registration request of the eUICC 131 to a network device.

The LPA 133 may be an application program installed in the terminal device. By using the LPA 133, the terminal device 13 may implement operations such as downloading a profile, triggering installation and updating of the card operating system of the eUICC 131, and local management. The LPA 133 may further provide a user interface for interaction between the terminal device 13 and a user (that is, an end user shown in FIG. 1). By using the user interface, the terminal device 13 may detect operation instructions such as installation and updating triggered by the user for the operating system of the eUICC 131, to manage the operating system of the terminal device 13.

As shown in FIG. 1, the ODS 11 may be further connected to an eUICC manufacturer (EUM) device and a mobile network operator (MNO) device. For example, the ODS 11 may obtain, from the EUM device, an authorization certificate issued by the EUM device to the ODS 11, and the ODS 11 may obtain authorization information of an operator or the like from the MNO device.

Figure 2:
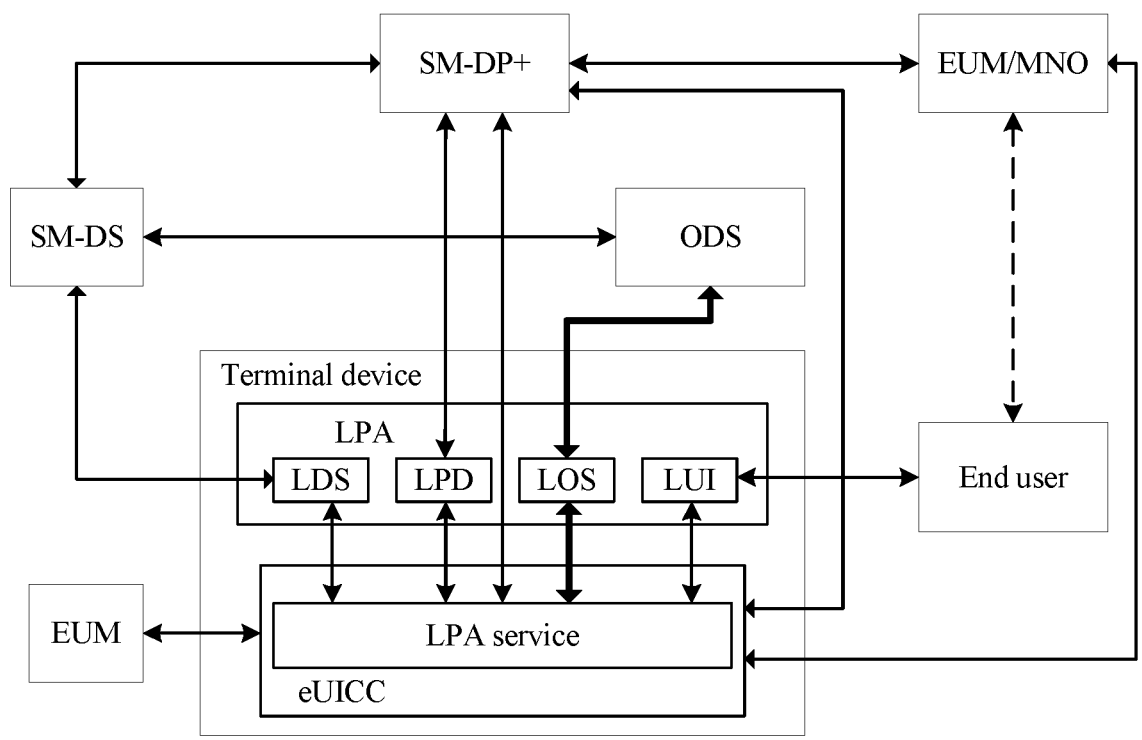
FIG. 2 is a schematic diagram of a network architecture of a communications network to which a method for updating an operating system is applied according to an embodiment of the present invention.

As shown in FIG. 2, the LPA in the terminal device 13 may include a local profile download (LPD) module, a local user interface (LUI), a local discovery service (LDS) module, and a local operating system update (Local OS Update, LOS) module. The LPD module is configured to interact with a subscription manager-data preparation (SM-DP) unit (also referred to as a profile configurator), to implement profile download. The LUI module is configured to provide a user interface for implementing interaction between the terminal device 13 and the end user. The LDS module is configured to implement interaction with the SM-DS 12. The LOS module is a module that is between the LPA 133 and the ODS 11 and is configured to control and manage updating of the operating system. As shown in FIG. 2, the eUICC may further include an LPA service module configured to interact with the LPA.

The SM-DS shown in FIG. 1 or FIG. 2 may be classified into a root SM-DS and an alternative SM-DS. The SM-DS in this embodiment of the present invention may be the root SM-DS, and the root SM-DS is an SM-DS that can directly communicate with the terminal device 13 by using the LPA (specifically, the LDS module in the LPA) in the terminal device 13. An address of the root SM-DS may be preset on the terminal device 13. For example, the address of the root SM-DS may be preset on the eUICC 131 in the terminal device 13.

Figure 3:
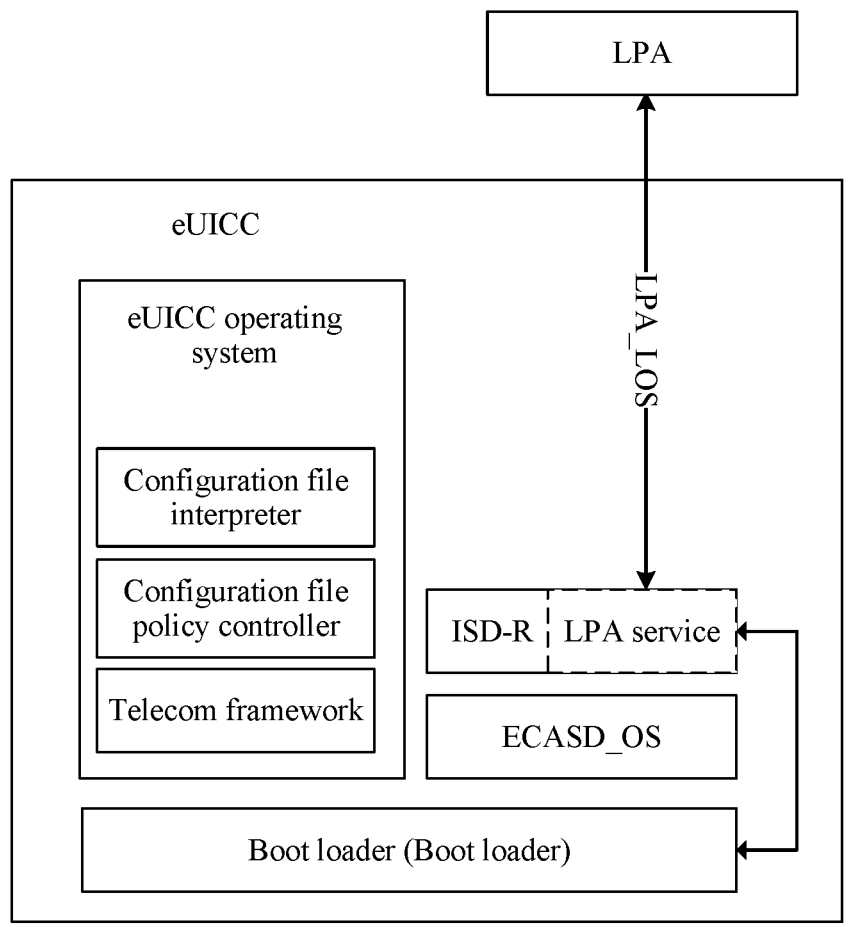
FIG. 3 is a schematic diagram of a structure of an eUICC according to an embodiment of the present invention.

FIG. 3 is a schematic diagram of a structure of an eUICC according to an embodiment of the present invention. As shown in FIG. 3, the eUICC 131 may include an eUICC controlling authority security domain (ECASD), a primary security domain root (Issuer Security Domain Root, ISD-R), a boot loader, and an eUICC operating system (that is, the operating system of the eUICC in this embodiment of the present invention). This embodiment of the present invention may be used to update the operating system of the eUICC shown in FIG. 3.

The ECASD is used to store a key and a certificate of the eUICC. The ISD-R is used to associate with a subscription manager-secure routing unit (SM-SR) out of the eUICC, establish a secure communication channel between the eUICC and the SM-SR, and create a new ISD-P. The boot loader is configured to cooperate with the LPA service to implement interaction between the eUICC and the LPA.

As shown in FIG. 3, the operating system of the eUICC may include a configuration file interpreter (Profile Package Interpreter), a configuration file policy controller (Profile Package Interpreter and Profile Policy Enabler), and a telecom framework. The telecom framework is used to provide a standard network authorization algorithm for a Network Access Agent (NAA), and may further use a requirement parameter configuration algorithm.

Figure 4:
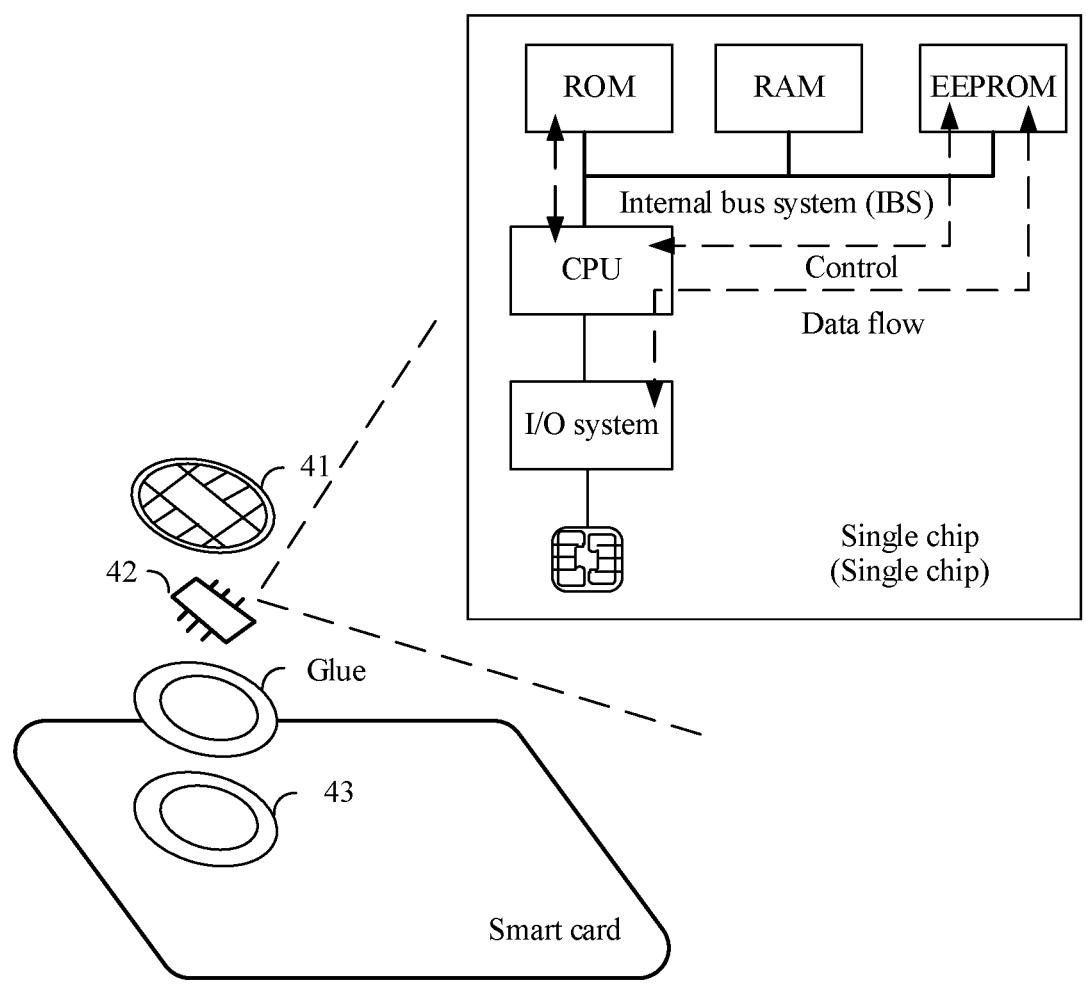
FIG. 4 is a schematic diagram of a structure of an eUICC according to an embodiment of the present invention.

FIG. 4 is a schematic diagram of a structure of an eUICC according to an embodiment of the present invention. As shown in FIG. 4, the eUICC may include a printed circuit board (Printed Circuit) 41, a microcontroller or microprocessor 42, and a plastic support board (Plastic Support) 43 of a smart card. The printed circuit board 41 and the microcontroller or microprocessor 42 are affixed to the plastic support board 43 by using glue.

FIG. 4 is a schematic diagram of a structure of the microcontroller or microprocessor 42. The microcontroller or microprocessor 42 may include a central processing unit (CPU), a read-only memory (ROM), a random access memory (RAM), an electrically erasable programmable read-only memory (EEPROM), and a serial communications input/output (I/O) system.

The ROM may be configured to store the operating system of the eUICC and a basic instruction. This embodiment of the present invention may be used to update the operating system of the eUICC that is stored in the ROM shown in FIG. 4. The RAM may be configured to store temporary data, for example, an intermediate computation result. The EEPROM may be configured to store various data and programs, and the operating system of the eUICC may read, write, and erase data in the EEPROM. The serial communications I/O system may be configured to communicate with the terminal device.

Figure 5A:
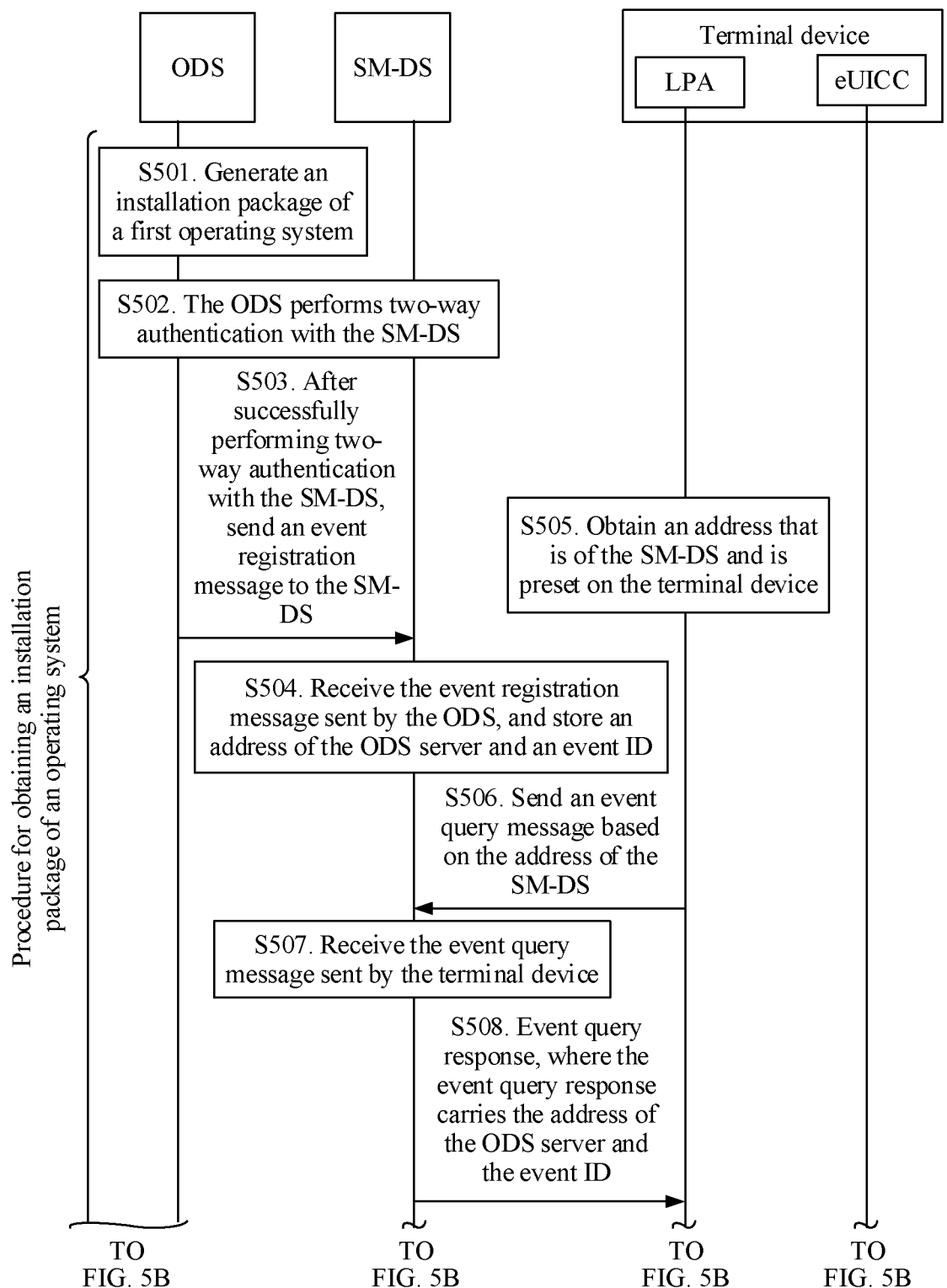
FIG. 5A and FIG. 5B are a flowchart of a method for updating an operating system according to an embodiment of the present invention.
Figure 5B:
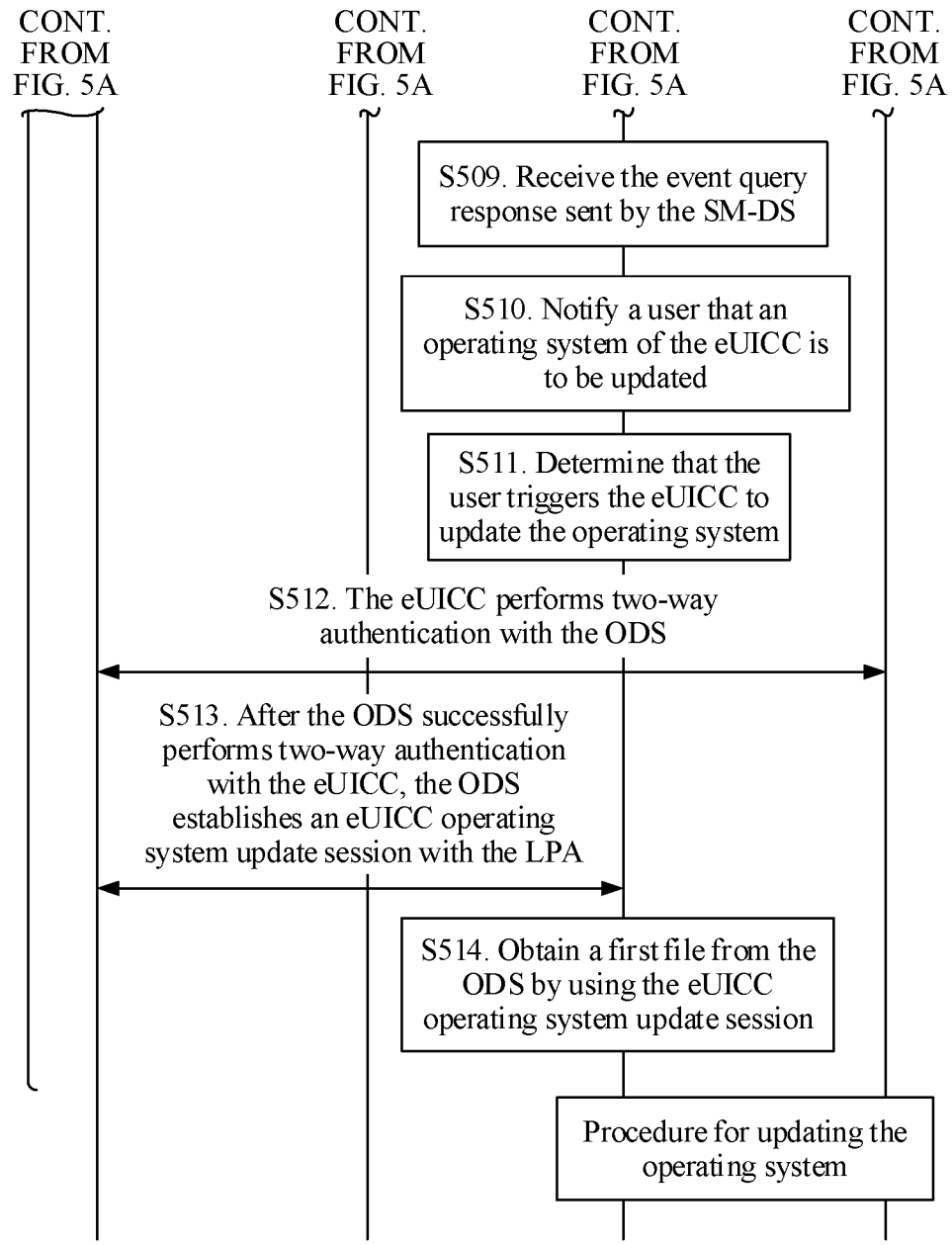

An embodiment of the present invention provides a method for updating an operating system. The method may be applied to a Software Defined-Network Functioning Virtualization (SD-NFV) network shown in FIG. 1. The method for updating an operating system may include a procedure for obtaining an installation package of an operating system and a procedure for updating the operating system. As shown in FIG. 5A and FIG. 5B, the procedure for obtaining an installation package of a COS may include S501 to S514.

S501. An ODS generates an installation package of a first operating system.

The installation package of the first operating system is a first file in this embodiment of the present invention. The first file may be an installation file of the first operating system (that is, a full installation file of the first operating system). To be specific, an eUICC may complete installation of the first operating system based on only the full installation file of the first operating system without referring to an installation file of a second operating system, where the second operating system is an operating system installed before the eUICC updates the operating system.

Alternatively, the first file may be an incremental file of the first operating system relative to a second operating system, where the second operating system is an operating system installed before an eUICC updates the operating system. To be specific, when the eUICC installs the first operating system, a used installation file is an installation file obtained by combining the first file with the installation file of the second operating system.

S502. The ODS performs two-way authentication with an SM-DS.

S503. After the ODS successfully performs two-way authentication with the SM-DS, the ODS sends an event registration message to the SM-DS.

The event registration message carries an address of the ODS server and an identity (Identification, ID) of an event. The event may be an event "the ODS generates a new installation package of the operating system (that is, the installation package of the first operating system)". The event ID may be used to indicate that the ODS generates the new installation package of the operating system, and that the operating system of the eUICC is to be updated.

S504. The SM-DS receives the event registration message sent by the ODS, and stores the address of the ODS server and the event ID.

S505. An LPA obtains an address that is of the SM-DS and is preset on a terminal device.

S506. The LPA sends an event query message to the SM-DS based on the address of the SM-DS.

S507. The SM-DS receives the event query message sent by the terminal device.

S508. The SM-DS sends an event query response to the terminal device, where the event query response carries the address of the ODS server and the event ID.

S509. The LPA receives the event query response sent by the SM-DS.

S510. The LPA notifies a user that the operating system of the eUICC is to be updated.

S511. The LPA determines that the user triggers the eUICC to update the operating system.

S512. The eUICC performs two-way authentication with the ODS.

The ODS may actively send the installation package of the first operating system (that is, the first file) to the terminal device after the ODS successfully performs two-way authentication with the eUICC. Specifically, after S512, the method in this embodiment of the present invention may further include S513 and S514.

S513. After the ODS successfully performs two-way authentication with the eUICC, the ODS establishes an eUICC operating system update session with the LPA.

After the ODS establishes the eUICC operating system update session with the LPA, a session identifier (Transaction ID) may be negotiated for the eUICC operating system update session, where the transaction ID is used to uniquely identify the eUICC operating system update session.

S514. The LPA obtains the first file from the ODS by using the eUICC operating system update session.

After obtaining the first file from the ODS, the LPA may interact with the eUICC to update the operating system of the eUICC. As described in FIG. 6A and FIG. 6B, or FIG. 7A and FIG. 7B, the procedure for updating the operating system may include S601 and a subsequent procedure.

S601. The LPA encapsulates slices of the first file to obtain a plurality of OS element data packets.

For example, the plurality of OS element data packets may be a plurality of 255-byte TLV data packets. As shown in FIG. 7, the first file may include an initialize secure channel field, an SMO field, an operating system OIK field, and payload information of the installation package of the first operating system.

The initialize secure channel field may be used to initialize a secure channel for transmitting the installation file of the first operating system. The SMO field may include metadata of the first operating system, and the metadata of the first operating system includes EUM information, information about a size of the first operating system, and version information of the first operating system. The OIK field is used to encrypt each OS element data packet (such as a TLV data packet) in the plurality of OS element data packets.

Figure 8:
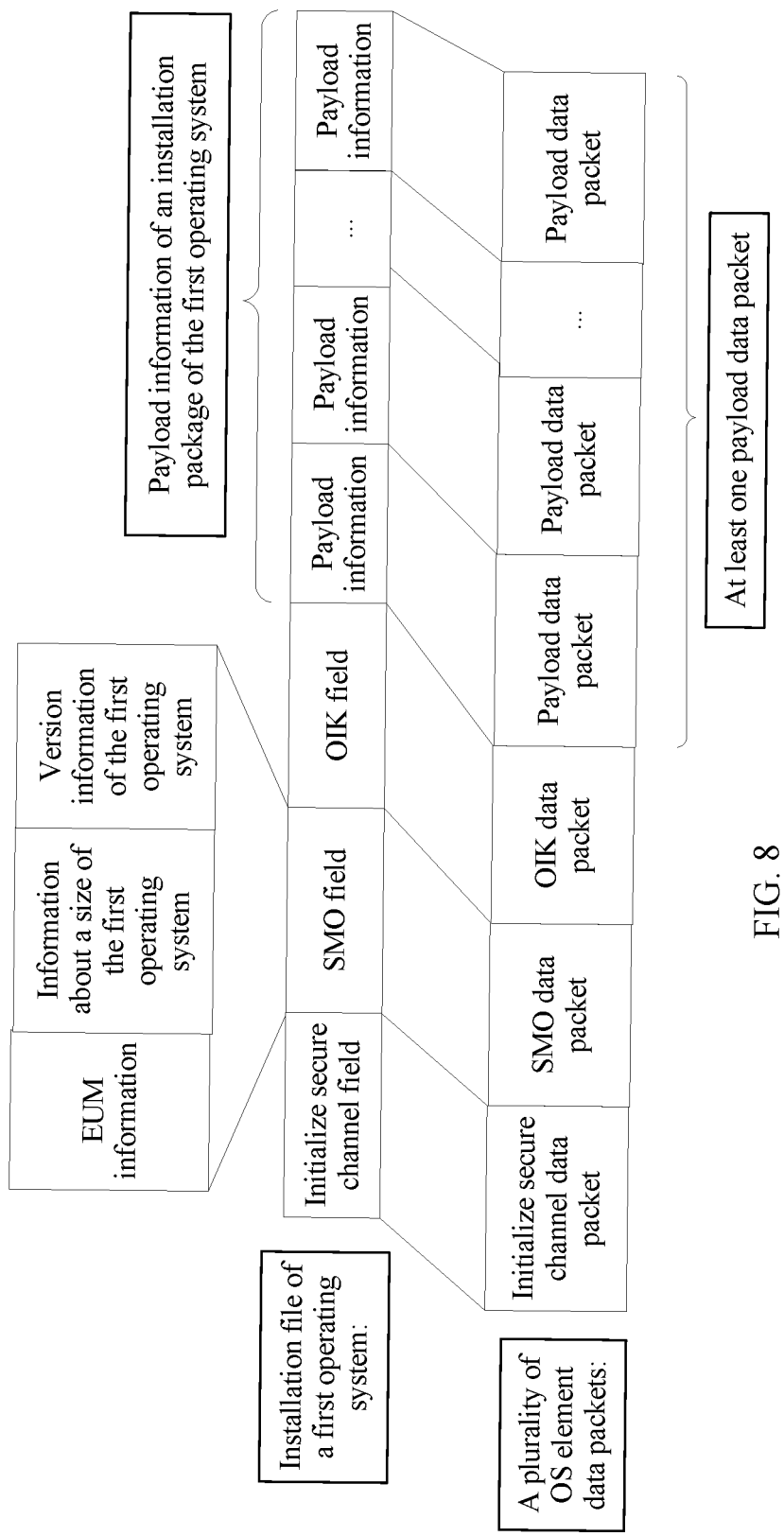
FIG. 8 is a schematic composition diagram of an installation file of a first operating system according to an embodiment of the present invention.

As shown in FIG. 8, the OS element data packets in this embodiment of the present invention may include an initialize secure channel data packet, an SMO data packet, an OIK data packet, and a plurality of payload data packets. The initialize secure channel data packet is obtained by encapsulating the initialize secure channel field, the SMO data packet is obtained by encapsulating the SMO field, the OIK data packet is obtained by encapsulating the OIK field, and at least one payload data packet is obtained by encapsulating a slice of the payload information of the installation package of the first operating system.

For example, assuming that the plurality of OS element data packets are M OS element data packets, where M≥2, and the at least one payload data packet is K payload data packets, M=K+3.

In a first application scenario of this embodiment of the present invention, by using an update instruction (such as a first update instruction or a second update instruction) carried in a restart instruction, the LPA may instruct the eUICC to: start to parse received data packets after receiving a part of OS element data packets in the plurality of OS element data packets, and install the first file ("installing while receiving") based on a parsing result, or start to parse received data packets only after receiving all of the plurality of OS element data packets, and install the first file based on a parsing result ("installing while receiving").

In a first implementation of the first application scenario, the LPA may determine whether remaining storage space of the eUICC is sufficient for storing the installation file of the first operating system and installing the first operating system, and then determine which update instruction (for example, the first update instruction or the second update instruction) is to be carried and sent to the eUICC.

Figure 6A:
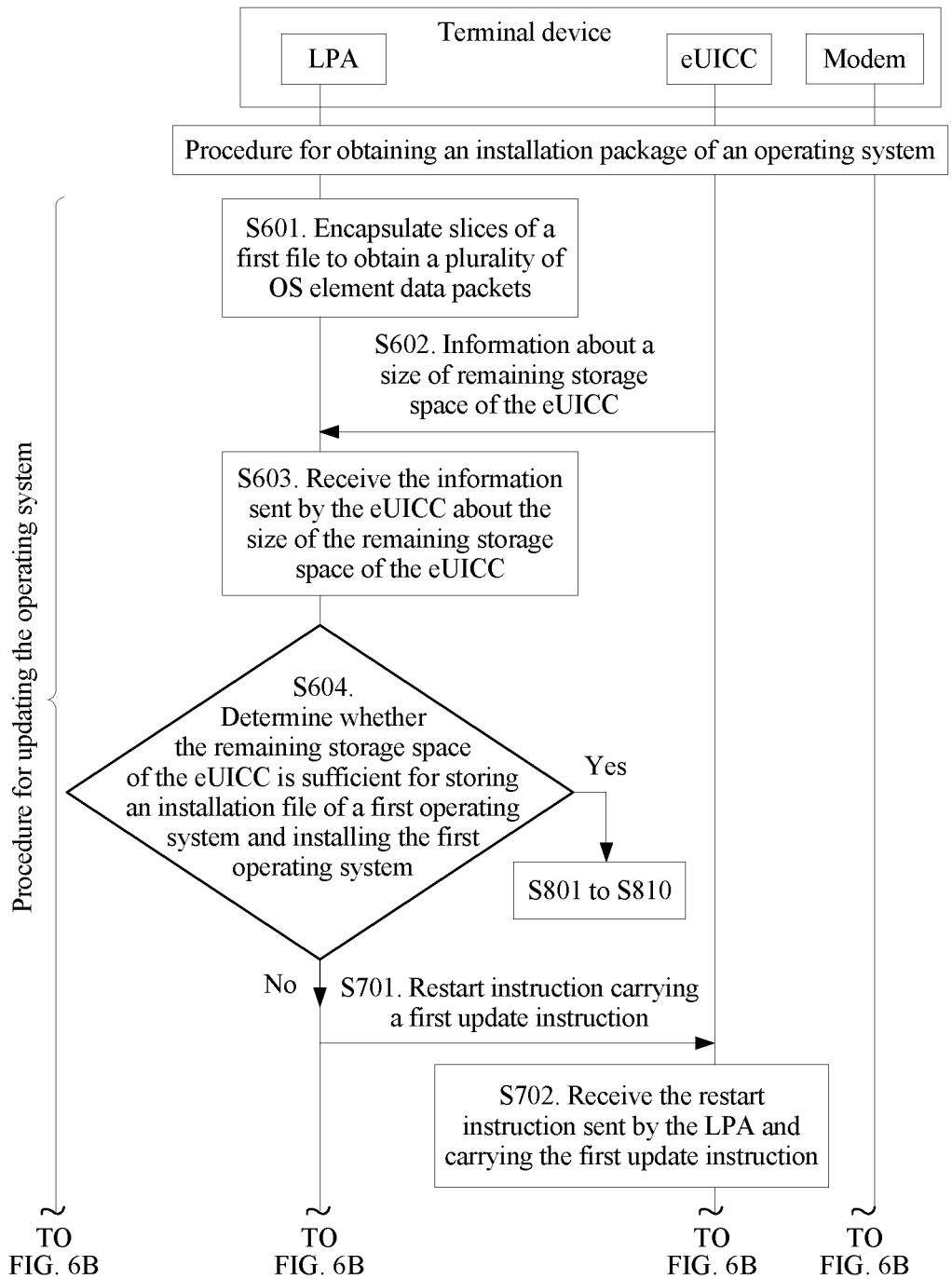
FIG. 6A and FIG. 6B are a flowchart of a method for updating an operating system according to an embodiment of the present invention.
Figure 7A:
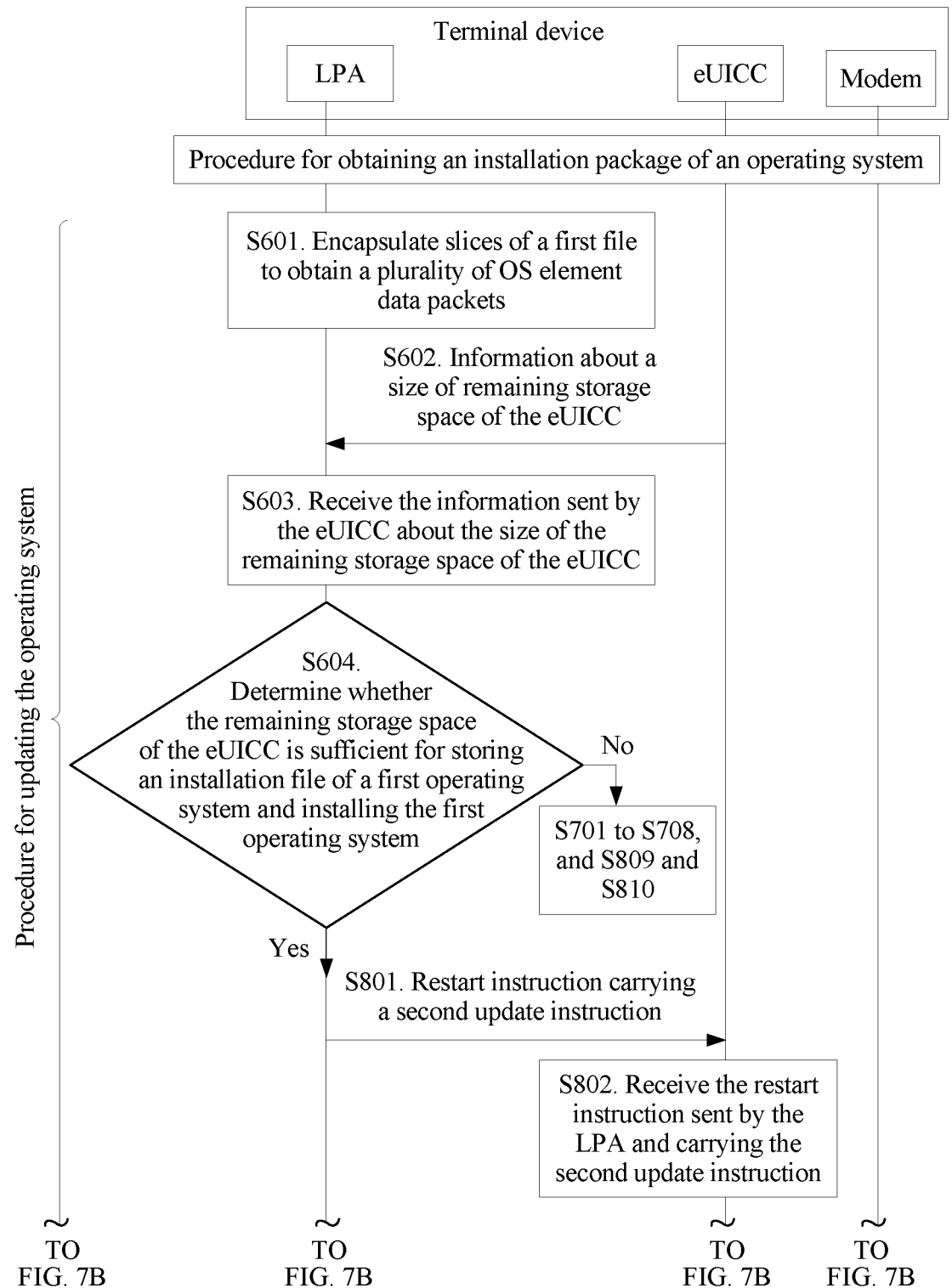
FIG. 7A and FIG. 7B are a flowchart of a method for updating an operating system according to an embodiment of the present invention.

In the first implementation of the first application scenario, as shown in FIG. 6A or FIG. 7A, after S601, the method in this embodiment of the present invention may include S602.

S602. The eUICC sends information about a size of remaining storage space of the eUICC to the LPA.

The remaining storage space of the eUICC is remaining storage space after the eUICC stores a subscription information set and an application and backs up the installation file of the second operating system.

S603. The LPA receives the information sent by the eUICC about the size of the remaining storage space of the eUICC.

S604. The LPA determines, based on the information about the size of the remaining storage space of the eUICC and information about a size of the installation file of the first operating system, whether the remaining storage space of the eUICC is sufficient for storing the installation file of the first operating system and installing the first operating system.

Specifically, if the LPA determines that the remaining storage space of the eUICC is insufficient for storing the installation file of the first operating system and installing the first operating system, S701 and a subsequent procedure continue to be performed; or if the LPA determines that the remaining storage space of the eUICC is sufficient for storing the installation file of the first operating system and installing the first operating system, S801 and a subsequent procedure continue to be performed.

S701. The LPA sends a restart instruction carrying a first update instruction to the eUICC.

The first update instruction is used to instruct the eUICC to parse, after the eUICC receives a part of OS element data packets in the plurality of OS element data packets, the OS element data packets received by the eUICC and install the first operating system based on a parsing result.

S702. The eUICC receives the restart instruction sent by the LPA and carrying the first update instruction.

The restart instruction is used to instruct the eUICC to perform a restart operation. Therefore, after receiving the restart instruction sent by the LPA, the eUICC may send a first initialization request to a modem of the terminal device, requesting the modem to control restart of the eUICC.

S703. The eUICC sends a first initialization request to a modem of the terminal device, where the first initialization request is used to request the modem of the terminal device to control restart of the eUICC.

S704. The modem receives the first initialization request sent by the eUICC, and controls restart of the eUICC.

After S701, the LPA may sequentially send the plurality of OS element data packets to the eUICC. To be specific, the method in this application may further include S705.

S705. The LPA sequentially sends the plurality of OS element data packets to the eUICC.

For example, the LPA may encapsulate the plurality of OS element data packets (for example, a plurality of TLV data packets) into a plurality of APDU commands separately, and transmit the APDU commands to the eUICC. One OS element data packet (for example, one TLV data packet) is encapsulated in each of the plurality of APDU commands.

S706. After the eUICC is restarted, the eUICC receives the plurality of OS element data packets that are sequentially sent by the LPA.

For example, the LPA may establish a communication session with the eUICC to send the plurality of OS element data packets of the first file. After the eUICC receives each OS element data packet sent by the LPA, the eUICC may return, to the LPA, a session identifier (Transaction ID) of a session that is negotiated between the LPA and the eUICC for the plurality of OS element data packets; after receiving the transaction ID, the LPA identifies whether the transaction ID is the session identifier of the session for the plurality of OS element data packets; and if yes, which indicates that the plurality of OS element data packets are transmitted in a same RSP session, the LPA may continue to send a next OS element data packet to the eUICC; or if no, the LPA may delete the session.

Correspondingly, the eUICC may receive the APDU commands sent by the LPA, where the OS element data packets (for example, TLV data packets) are encapsulated in the APDU commands.

S707. After the eUICC receives a part of OS element data packets in the plurality of OS element data packets, the eUICC parses the OS element data packets received by the eUICC, and installs the first operating system based on a parsing result.

Because the first update instruction is used to instruct the eUICC to parse, after the eUICC receives the part of OS element data packets in the plurality of OS element data packets, the OS element data packets received by the eUICC and install the first operating system based on the parsing result, after the eUICC receives the part of OS element data packets, the eUICC may parse the OS element data packets received by the eUICC, and install the first operating system based on the parsing result.

For example, the part of OS element data packets may include at least the initialize secure channel data packet, the SMO data packet, and the OIK data packet that are shown in FIG. 7.

S708. After the eUICC installs the first operating system based on a parsing result of a first OS element data packet, the eUICC deletes the first OS element data packet.

After the eUICC installs the first operating system based on a parsing result of an OS element data packet, the eUICC deletes the OS element data packet. In this way, there is no need to store all the OS element data packets in storage space of the eUICC. Therefore, a problem that due to a limited capacity of storage space of an eUICC, an operating system of the eUICC fails to be updated and the eUICC cannot install a new operating system can be resolved.

If the LPA determines that the remaining storage space of the eUICC is sufficient for storing the installation file of the first operating system and installing the first operating system, S801 and a subsequent procedure may continue to be performed.

S801. The LPA sends a restart instruction carrying a second update instruction to the eUICC.

The second update instruction is used to instruct the eUICC to parse the plurality of OS element data packets after receiving the plurality of OS element data packets and install the first operating system based on a parsing result.

The first update instruction is used to instruct the eUICC to parse, after the eUICC receives a part of OS element data packets in the plurality of OS element data packets, the OS element data packets received by the eUICC and install the first operating system based on a parsing result.

S802. The eUICC receives the restart instruction sent by the LPA and carrying the second update instruction.

The restart instruction is used to instruct the eUICC to perform a restart operation. Therefore, after receiving the restart instruction sent by the LPA, the eUICC may send a first initialization request to a modem of the terminal device, requesting the modem to control restart of the eUICC.

S803. The eUICC sends a first initialization request to a modem of the terminal device, where the first initialization request is used to request the modem of the terminal device to control restart of the eUICC.

S804. The modem receives the first initialization request sent by the eUICC, and controls restart of the eUICC.

After S801, the LPA may sequentially send the plurality of OS element data packets to the eUICC. To be specific, the method in this application may further include S805.

S805. The LPA sequentially sends the plurality of OS element data packets to the eUICC.

S806. After the eUICC is restarted, the eUICC receives the plurality of OS element data packets that are sequentially sent by the LPA.

S807. After the eUICC receives the plurality of OS element data packets, the eUICC parses the plurality of OS element data packets, and installs the first operating system based on a parsing result.

Because the second update instruction is used to instruct the eUICC to parse the plurality of OS element data packets after the eUICC receives all of the plurality of OS element data packets and install the first operating system based on the parsing result, the eUICC may parse the plurality of OS element data packets only after the eUICC receives the plurality of OS element data packets, and install the first operating system based on the parsing result.

For example, the part of OS element data packets may include at least the initialize secure channel data packet, the SMO data packet, and the OIK data packet that are shown in FIG. 7.

S808. After the eUICC installs the first operating system based on a parsing result of a first OS element data packet, the eUICC deletes the first OS element data packet.

Figure 6B:
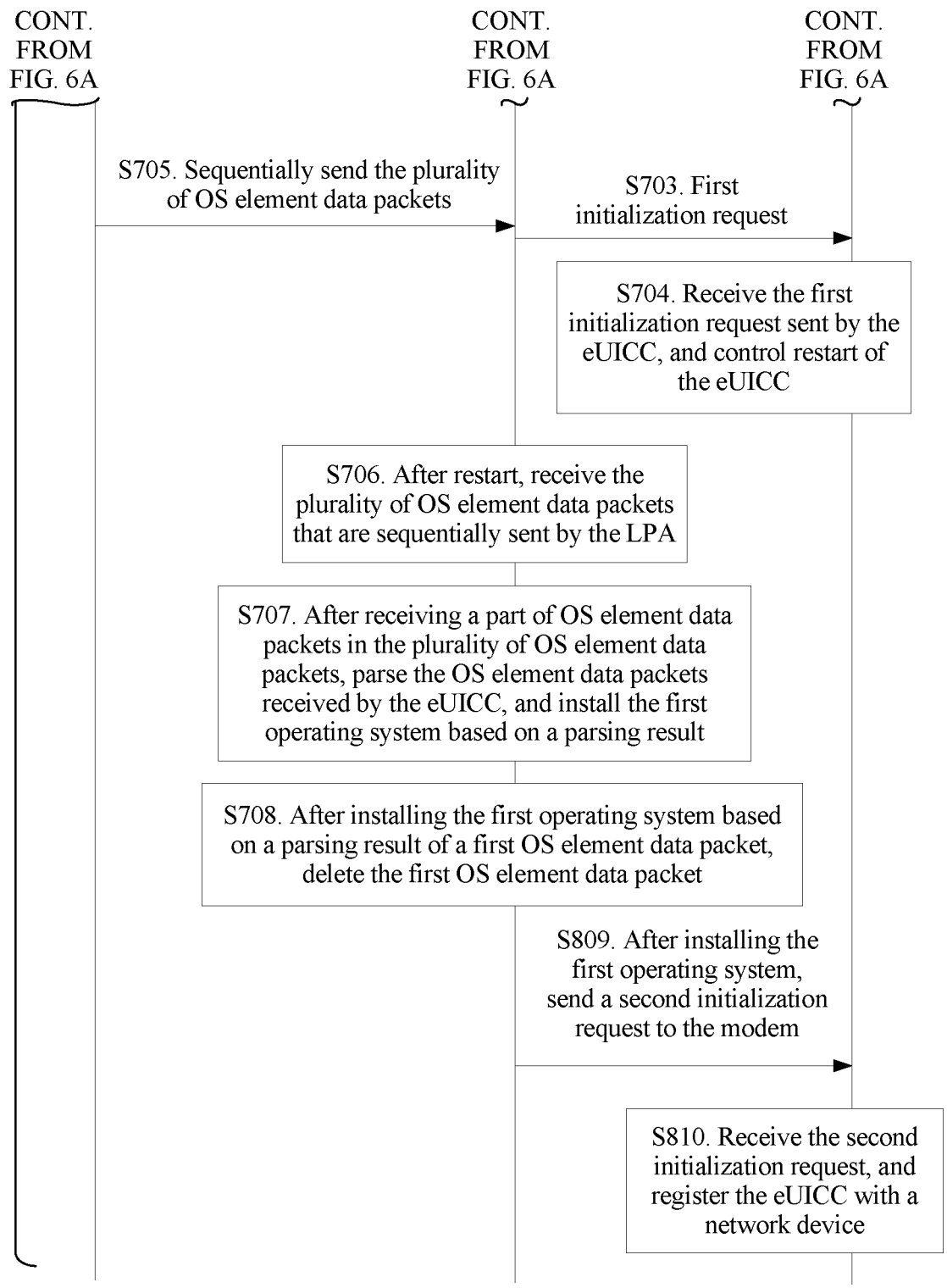
Figure 7B:
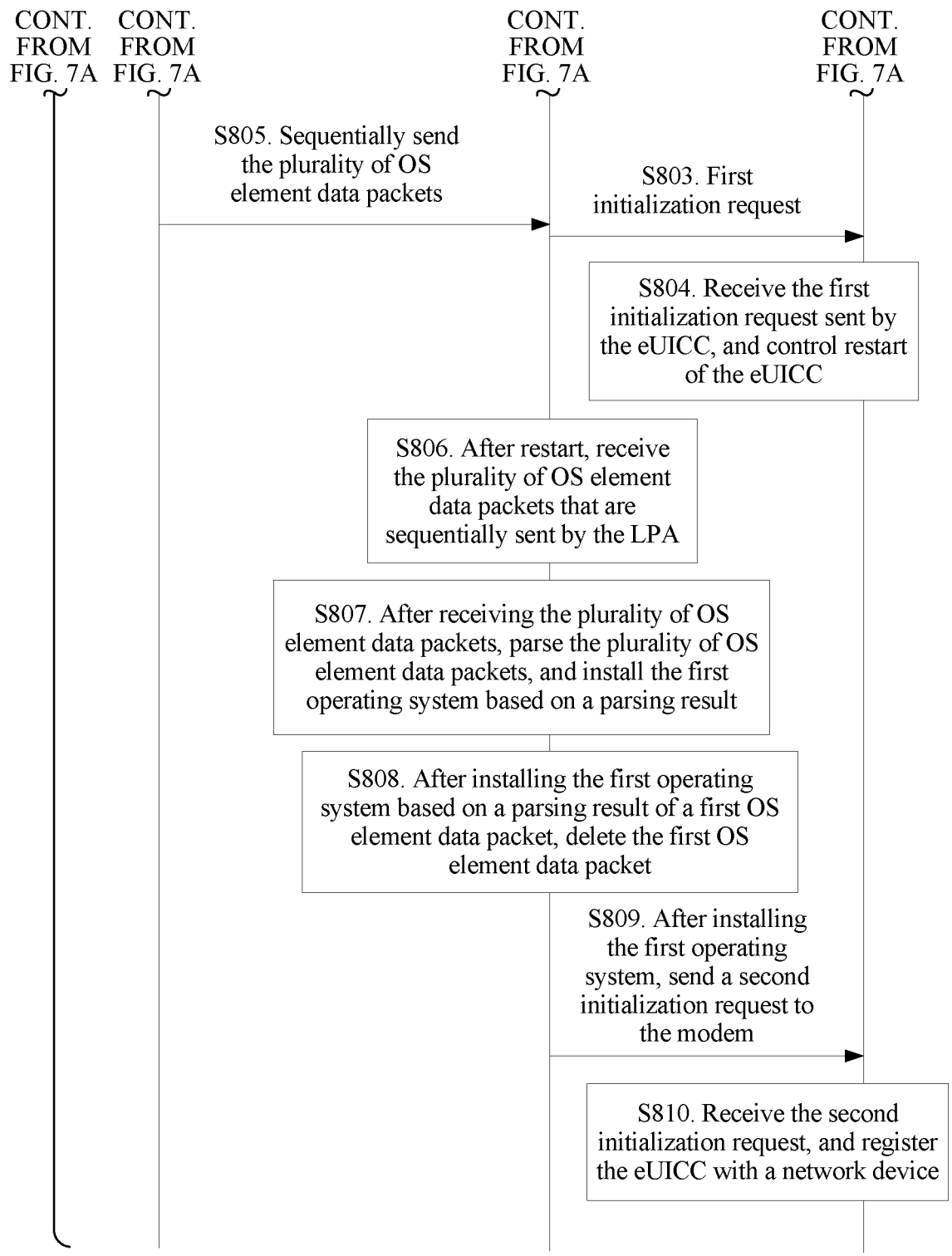

Further, after the eUICC installs the first operating system, to ensure normal use of the first operating system, the eUICC further needs to re-register the eUICC with a network device. As shown in FIG. 6B, after S708, the method in this embodiment of the present invention may further include S809 and S810, or as shown in FIG. 7B, after S808, the method in this embodiment of the present invention may further include S809 and S810.

S809. After the eUICC installs the first operating system, the eUICC sends a second initialization request to the modem.

The second initialization request is used to request to register the eUICC with the network device.

S810. The modem receives the second initialization request, and registers the eUICC with the network device.

Further, to ensure that the second operating system can be reinstalled after installation of the first operating system fails, after S703 and before S707, or after S803 and before S807, the method in this embodiment of the present invention may further include: the eUICC backs up the installation file of the second operating system; and if the eUICC fails to install the first operating system, the eUICC installs the second operating system based on the backup installation file of the second operating system.

In a method for updating an operating system according to this embodiment of the present invention, because the plurality of OS element data packets are obtained by encapsulating the slices of the first file, storage space required for storing the part of OS element data packets in the plurality of OS element data packets is smaller than storage space required for storing the first file. Therefore, even if the remaining storage space of the eUICC is insufficient for storing the installation file of the first operating system and installing the first operating system, the eUICC may start to parse the received part of OS element data packets when receiving the part of OS element data packets, and start to install the first operating system based on the parsing result, and after installing the first operating system by using a parsing result of an OS element data packet (the first OS element data packet), delete the OS element data packet to reduce occupation of the storage space of the eUICC by the OS element data packet. The first operating system does not need to be installed based on all of the plurality of OS element data packets. Therefore, a problem that due to a limited capacity of storage space of an eUICC, an operating system of the eUICC fails to be updated and the eUICC cannot install a new operating system can be resolved.

In a second implementation of the first application scenario, the eUICC may determine whether remaining storage space of the eUICC is sufficient for storing the installation file of the first operating system and installing the first operating system, and then indicate, to the LPA by using indication information (such as first indication information or second indication information), that the remaining storage space of the eUICC is insufficient for storing the installation file of the first operating system and installing the first operating system, or that the remaining storage space of the eUICC is sufficient for storing the installation file of the first operating system and installing the first operating system, so that the LPA determines which update instruction (for example, the first update instruction or the second update instruction) is to be carried and sent to the eUICC. Specifically, in the second implementation of the first application scenario, the foregoing S602 to 604 may be replaced with S901 to S907.

S901. The LPA sends information about a size of the installation file of the first operating system to the eUICC.

S902. The eUICC receives the information, sent by the LPA, about the size of the installation file of the first operating system.

S903. The eUICC determines, based on information about a size of remaining storage space of the eUICC and the information about the size of the installation file of the first operating system, whether the remaining storage space of the eUICC is sufficient for storing the installation file of the first operating system and installing the first operating system.

Specifically, if the eUICC determines that the remaining storage space of the eUICC is insufficient for storing the installation file of the first operating system and installing the first operating system, S904 and a subsequent procedure continue to be performed; or if the eUICC determines that the remaining storage space of the eUICC is sufficient for storing the installation file of the first operating system and installing the first operating system, S906 and a subsequent procedure continue to be performed.

S904. The eUICC sends first indication information to the LPA.

S905. The LPA receives the first indication information sent by the eUICC.

After the LPA receives the first indication information sent by the eUICC, the LPA may determine that the remaining storage space of the eUICC is insufficient for storing the installation file of the first operating system and installing the first operating system. In this case, S701 and the subsequent procedure may continue to be performed.

S906. The eUICC sends second indication information to the LPA.

S907. The LPA receives the second indication information sent by the eUICC.

After the LPA receives the second indication information sent by the eUICC, the LPA may determine that the remaining storage space of the eUICC is insufficient for storing the installation file of the first operating system and installing the first operating system. In this case, S801 and the subsequent procedure may continue to be performed.

For example, the first indication information or the second update instruction in this embodiment of the present invention may be a character of one bit. For example, the first indication information may be "1", used to indicate that the remaining storage space of the eUICC is insufficient for storing the installation file of the first operating system and installing the first operating system, and the second indication information may be "0", used to indicate that the remaining storage space of the eUICC is sufficient for storing the installation file of the first operating system and installing the first operating system; or the first indication information may be "0", used to indicate that the remaining storage space of the eUICC is insufficient for storing the installation file of the first operating system and installing the first operating system, and the second indication information may be "1", used to indicate that the remaining storage space of the eUICC is sufficient for storing the installation file of the first operating system and installing the first operating system.

In the first or the second implementation of the first application scenario, the first file may be the installation file of the first operating system (that is, the full installation file of the first operating system). In the two implementations, the eUICC can complete the installation of the first operating system based on only the full installation file of the first operating system, without referring to the installation file of the second operating system.

However, in a third implementation and a fourth implementation of the first application scenario, the first file may be the incremental file of the first operating system relative to the second operating system. To be specific, when the eUICC installs the first operating system, the used installation file is the installation file obtained by combining the first file with the installation file of the second operating system.

Figure 9A:
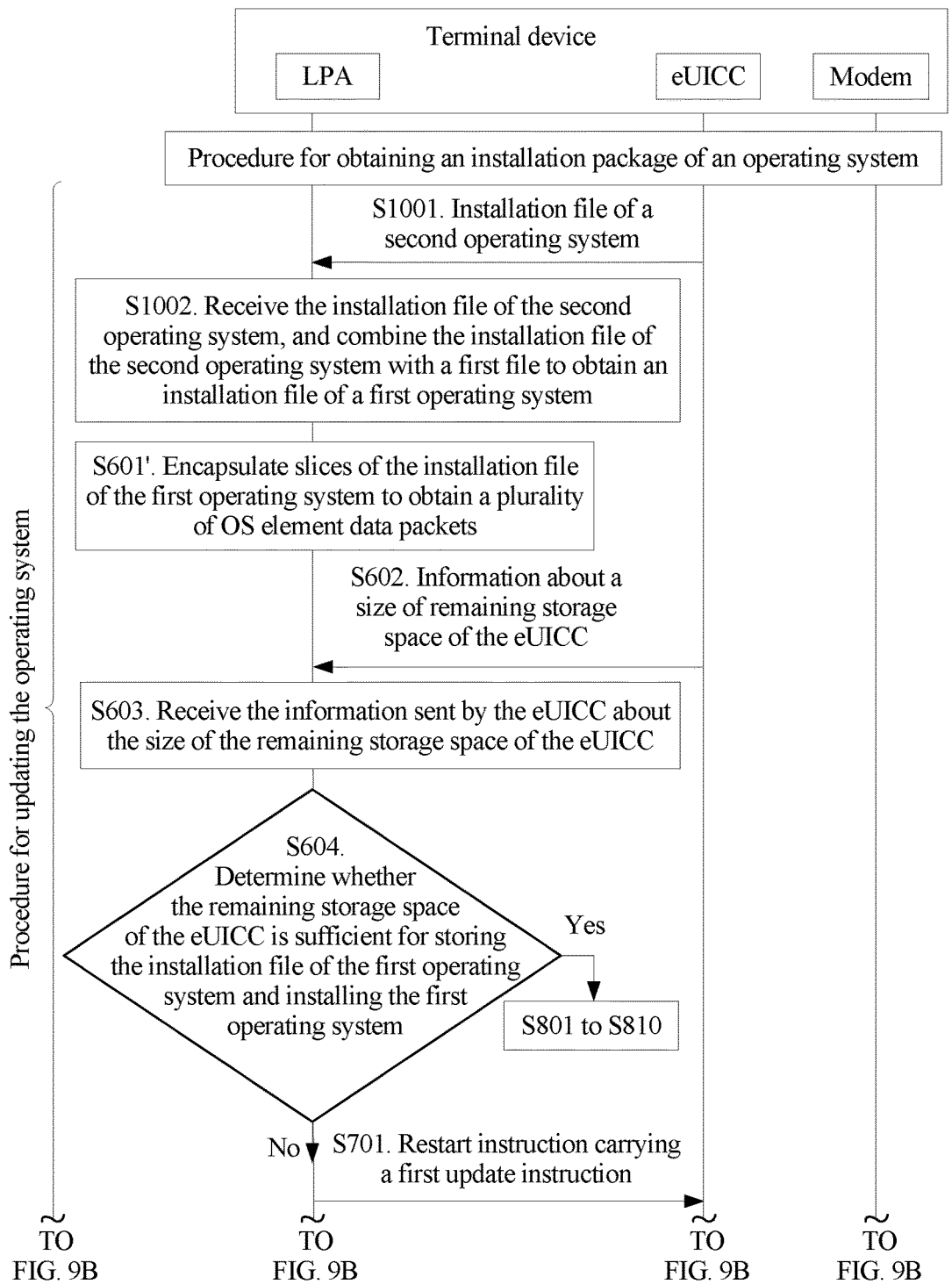
FIG. 9A and FIG. 9B are a flowchart of a method for updating an operating system according to an embodiment of the present invention.
Figure 9B:
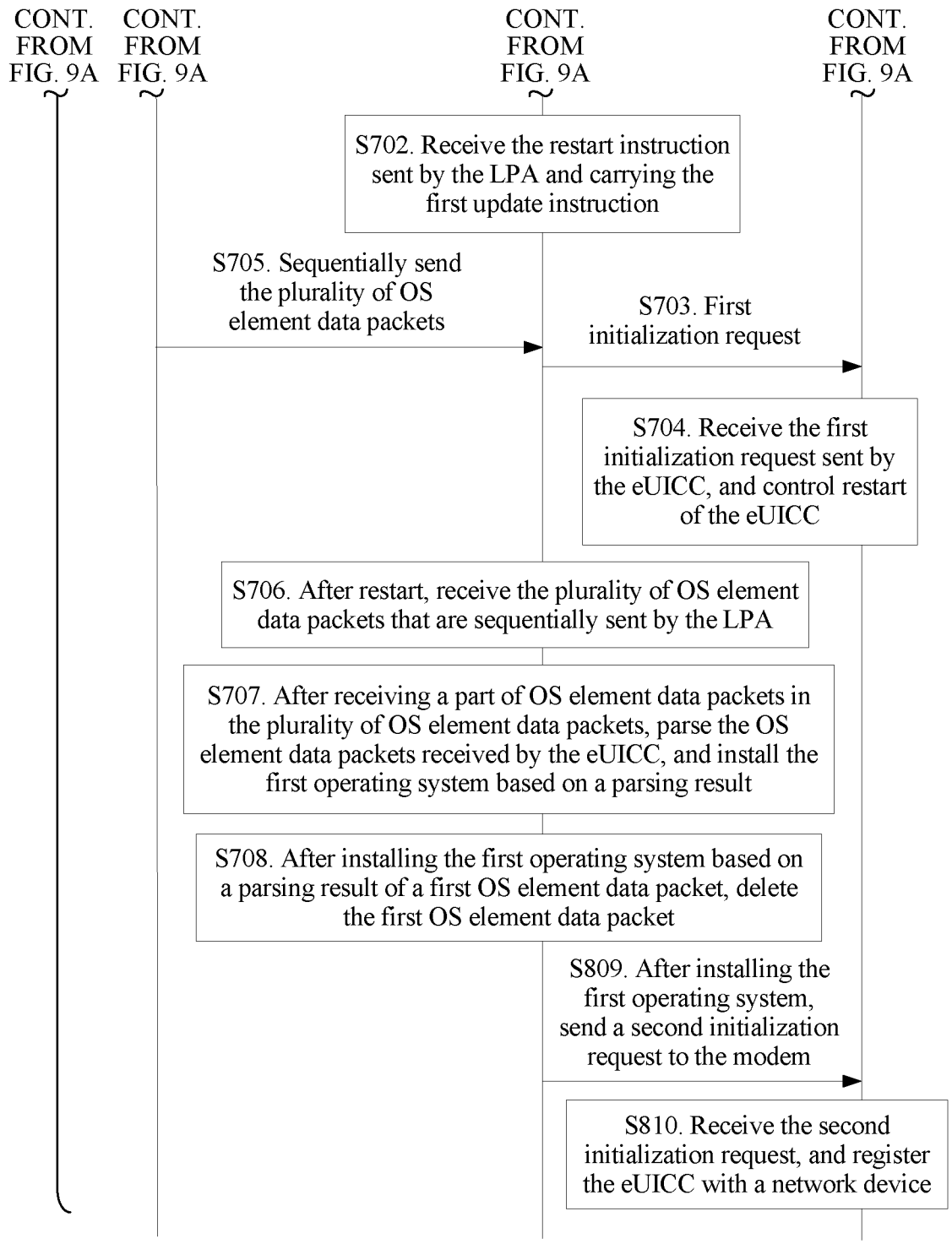

In the third implementation, the LPA may combine the first file with the installation file of the second operating system to obtain the installation file of the first operating system. Before S601, the method in this embodiment of the present invention may further include S1001 and S1002. For example, as shown in FIG. 9A, before S601 shown in FIG. 6A, the method in this embodiment of the present invention may further include S1001 and S1002.

S1001. The eUICC sends the installation file of the second operating system to the LPA.

S1002. The LPA receives the installation file of the second operating system, and combines the installation file of the second operating system with the first file to obtain the installation file of the first operating system.

For a method for combining the installation file of the second operating system with the first file to obtain the installation file of the first operating system by the LPA, refer to a related method for combining an incremental file with an installation file of an old operating system to obtain an installation file of a new operating system in the prior art. Details are not described again herein in this embodiment of the present invention.

Correspondingly, the foregoing S601 may be replaced with S601'. For example, as shown in FIG. 9A, S601 shown in FIG. 6A may be replaced with S601'.

S601'. The LPA encapsulates slices of the installation file of the first operating system to obtain a plurality of OS element data packets.

Figure 10A:
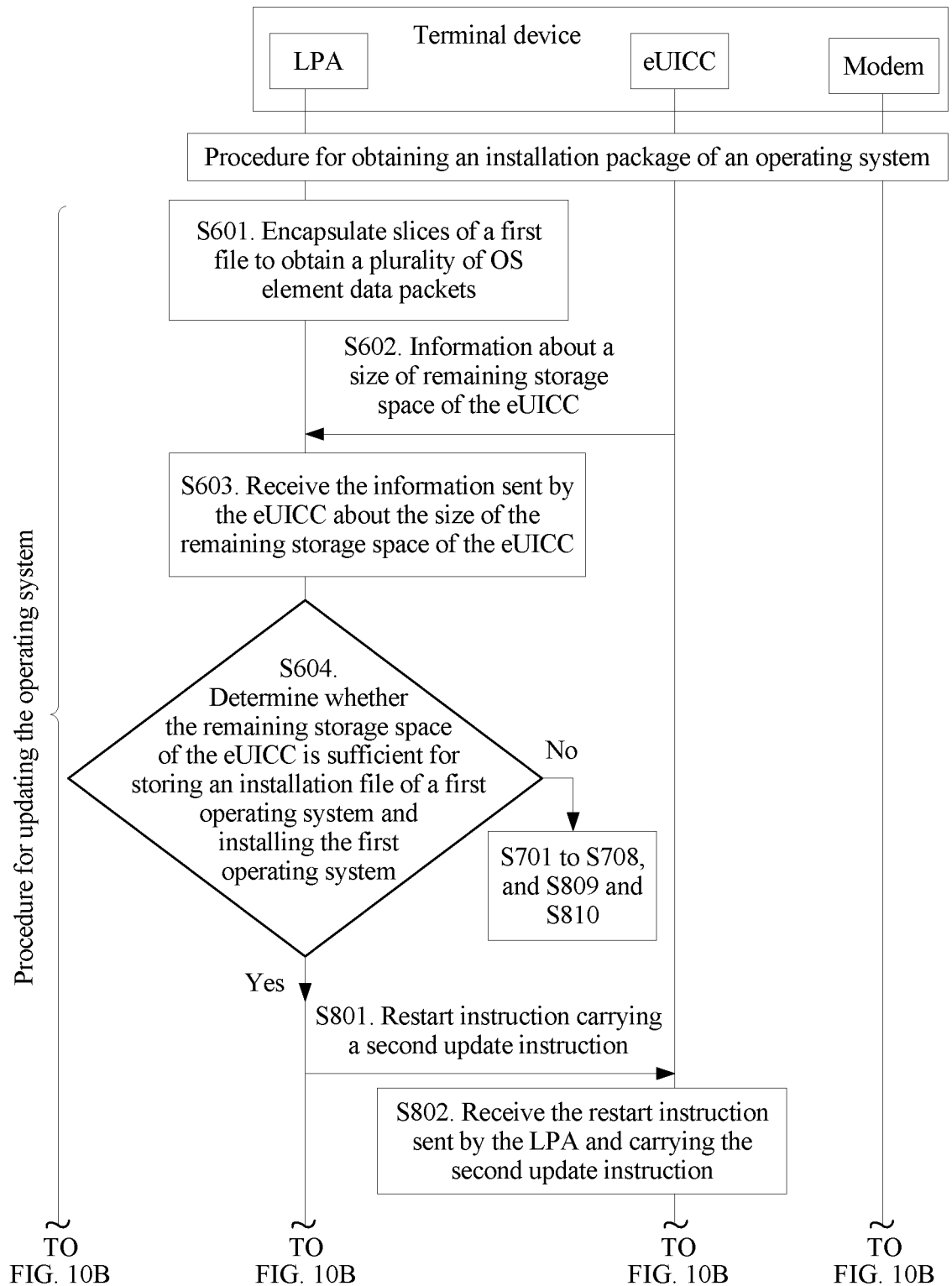
FIG. 10A and FIG. 10B are a flowchart of a method for updating an operating system according to an embodiment of the present invention.
Figure 10B:
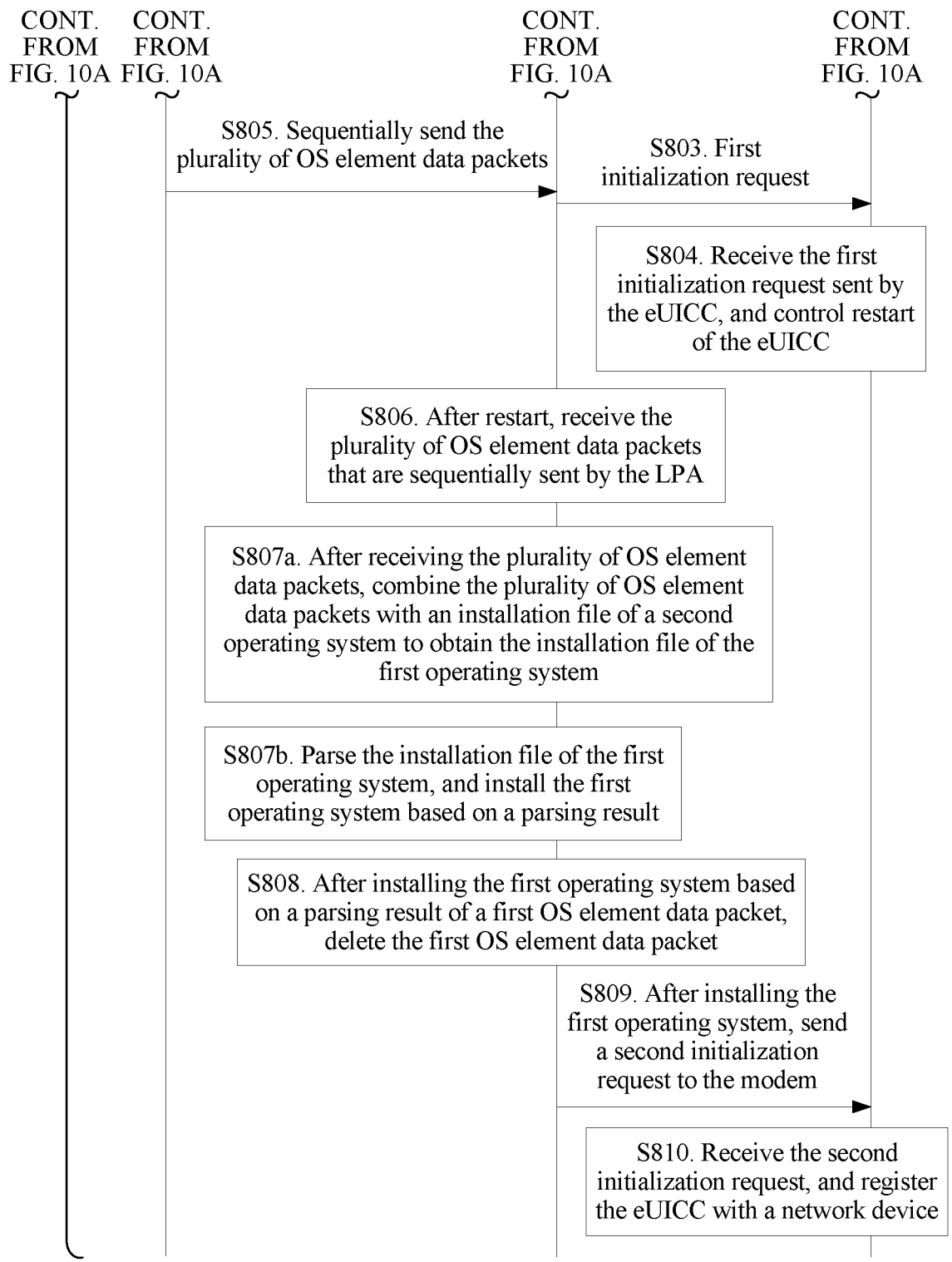

In the fourth implementation, the LPA may directly encapsulate slices of the first file and send the encapsulated slices of the first file to the eUICC; and the eUICC combines the first file with the installation file of the second operating system to obtain the installation file of the first operating system. If the eUICC needs to combine the first file with the installation file of the second operating system to obtain the installation file of the first operating system, it is ensured that remaining storage space of the eUICC is sufficient for storing the installation file of the first operating system and installing the first operating system, so that the eUICC can have sufficient storage space for storing the first file and the installation file of the second operating system. As shown in FIG. 10B, S807 shown in FIG. 7B may be replaced with S807a and S807b.

S807a. After the eUICC receives the plurality of OS element data packets, the eUICC combines the plurality of OS element data packets with the installation file of the second operating system to obtain the installation file of the first operating system.

S807b. The eUICC parses the installation file of the first operating system, and installs the first operating system based on a parsing result.

In a second application scenario of this embodiment of the present invention, the eUICC itself may determine, based on whether remaining storage space of the eUICC is sufficient for storing the installation file of the first operating system and installing the first operating system, whether to perform "installing while receiving" or "installing while receiving", instead of being instructed, by the LPA by using a restart instruction carrying an update instruction, to perform "installing while receiving" or "installing while receiving". Therefore, in the second application scenario, the restart instruction does not carry the first update instruction or the second update instruction.

In a first implementation of the second application scenario, the LPA may determine whether the remaining storage space of the eUICC is sufficient for storing the installation file of the first operating system and installing the first operating system, and then determine which update instruction (for example, the first update instruction or the second update instruction) is to be carried and sent to the eUICC. In this implementation, after S604, if the LPA determines that the remaining storage space of the eUICC is insufficient for storing the installation file of the first operating system and installing the first operating system, S1101 and a subsequent procedure continue to be performed; or if the LPA determines that the remaining storage space of the eUICC is sufficient for storing the installation file of the first operating system and installing the first operating system, S1201 and a subsequent procedure continue to be performed.

For example, as shown in FIG. 11A and FIG. 11B, or FIG. 12A and FIG. 12B, after S604 shown in FIG. 6A, if the LPA determines that the remaining storage space of the eUICC is insufficient for storing the installation file of the first operating system and installing the first operating system, S1101 and the subsequent procedure continue to be performed; or if the LPA determines that the remaining storage space of the eUICC is sufficient for storing the installation file of the first operating system and installing the first operating system, S1201 and the subsequent procedure continue to be performed.

S1101. The LPA sends first indication information to the eUICC.

S1102. The eUICC receives the first indication information sent by the LPA.

The first indication information is used to indicate that the remaining storage space of the eUICC is insufficient for storing the installation file of the first operating system and installing the first operating system.

S1103. The LPA sends a restart instruction to the eUICC.

S1104. The eUICC receives the restart instruction sent by the LPA.

The restart instruction is used to instruct the eUICC to perform a restart operation. The restart instruction does not carry the foregoing first update instruction or second update instruction.

Figure 11A:
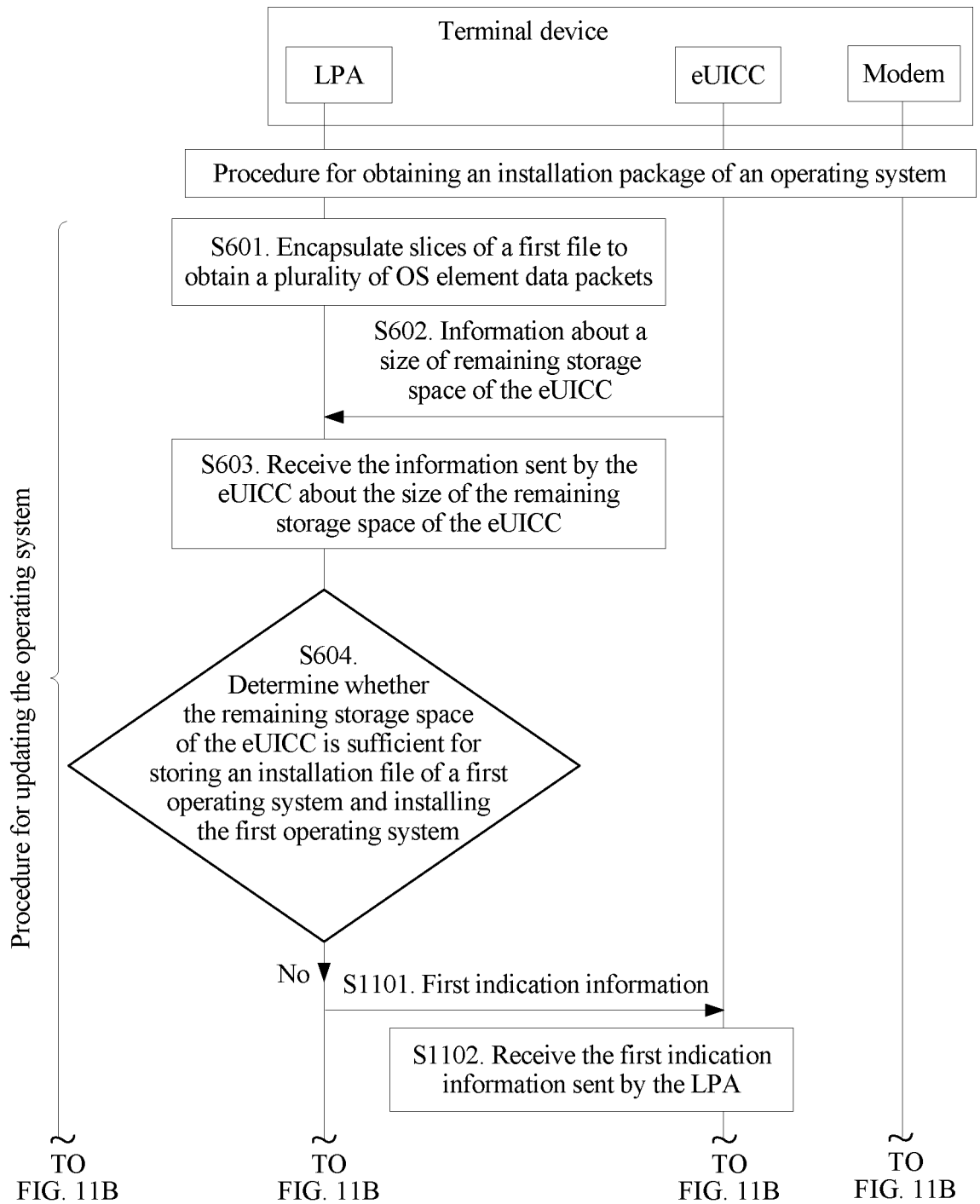
FIG. 11A and FIG. 11B are a flowchart of a method for updating an operating system according to an embodiment of the present invention.
Figure 11B:
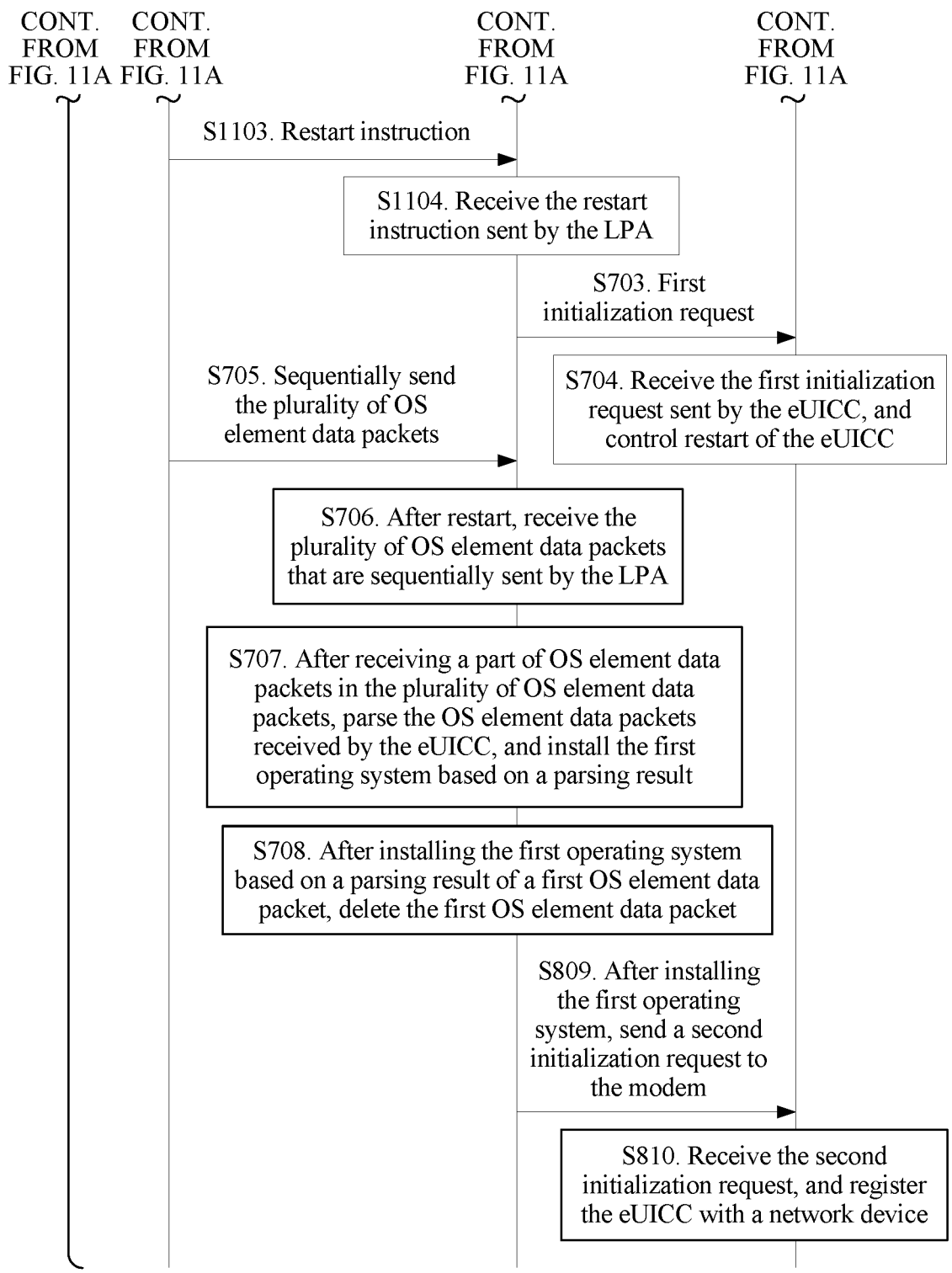

Because the first indication information is used to indicate that the remaining storage space of the eUICC is insufficient for storing the installation file of the first operating system and installing the first operating system, after the eUICC is restarted and receives a part of OS element data packets in the plurality of OS element data packets, the eUICC may parse the OS element data packets received by the eUICC, and install the first operating system based on a parsing result. To be specific, as shown in FIG. 11B, after S1103, the method in this embodiment of the present invention may further include S704 to S708, and S809 and S810.

S1201. The LPA sends second indication information to the eUICC.

S1202. The eUICC receives the second indication information sent by the LPA.

The second indication information is used to indicate that the remaining storage space of the eUICC is sufficient for storing the installation file of the first operating system and installing the first operating system.

S1203. The LPA sends a restart instruction to the eUICC.

S1204. The eUICC receives the restart instruction sent by the LPA.

The restart instruction is used to instruct the eUICC to perform a restart operation. The restart instruction does not carry the foregoing first update instruction or second update instruction.

Figure 12A:
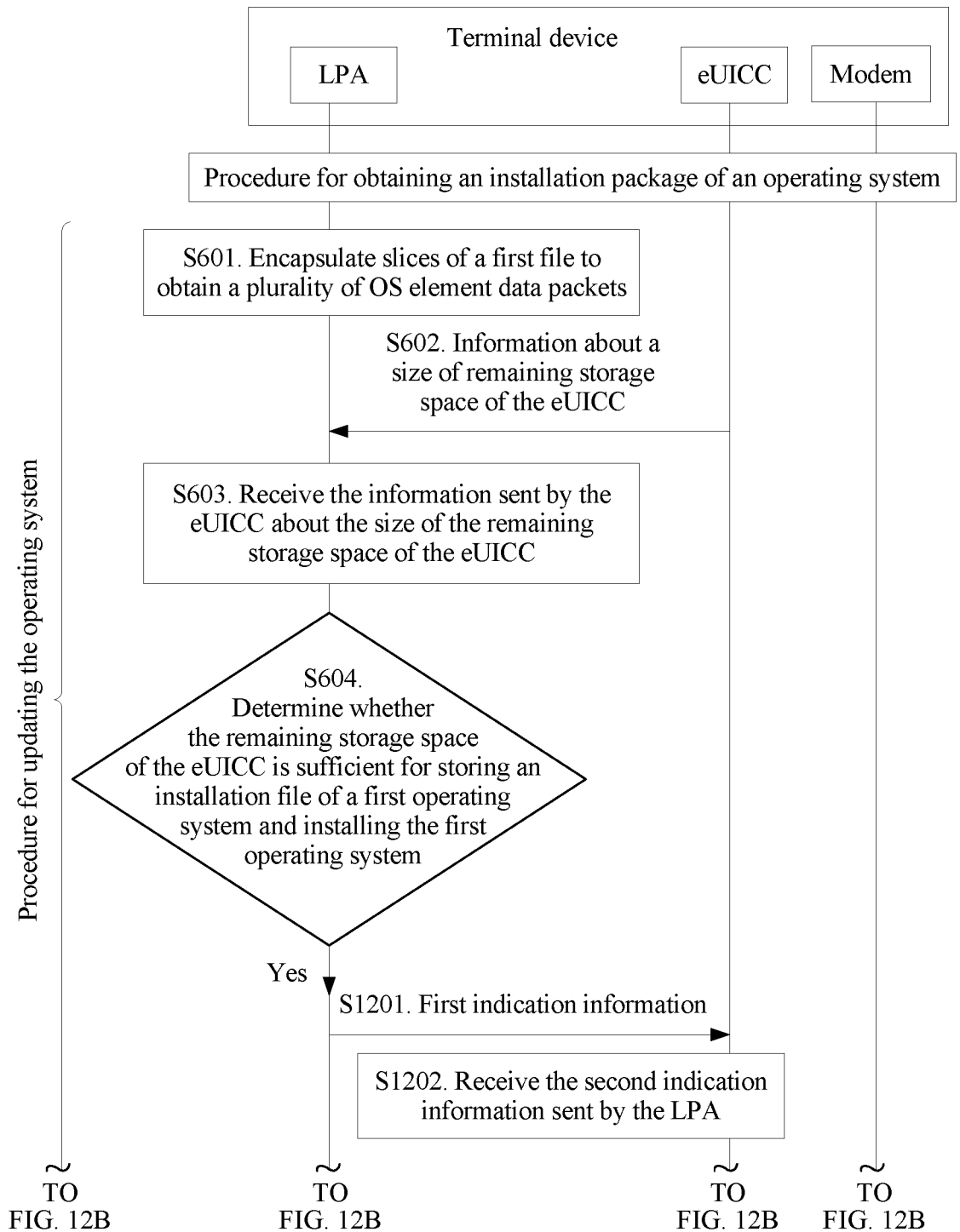
FIG. 12A and FIG. 12B are a flowchart of a method for updating an operating system according to an embodiment of the present invention.
Figure 12B:
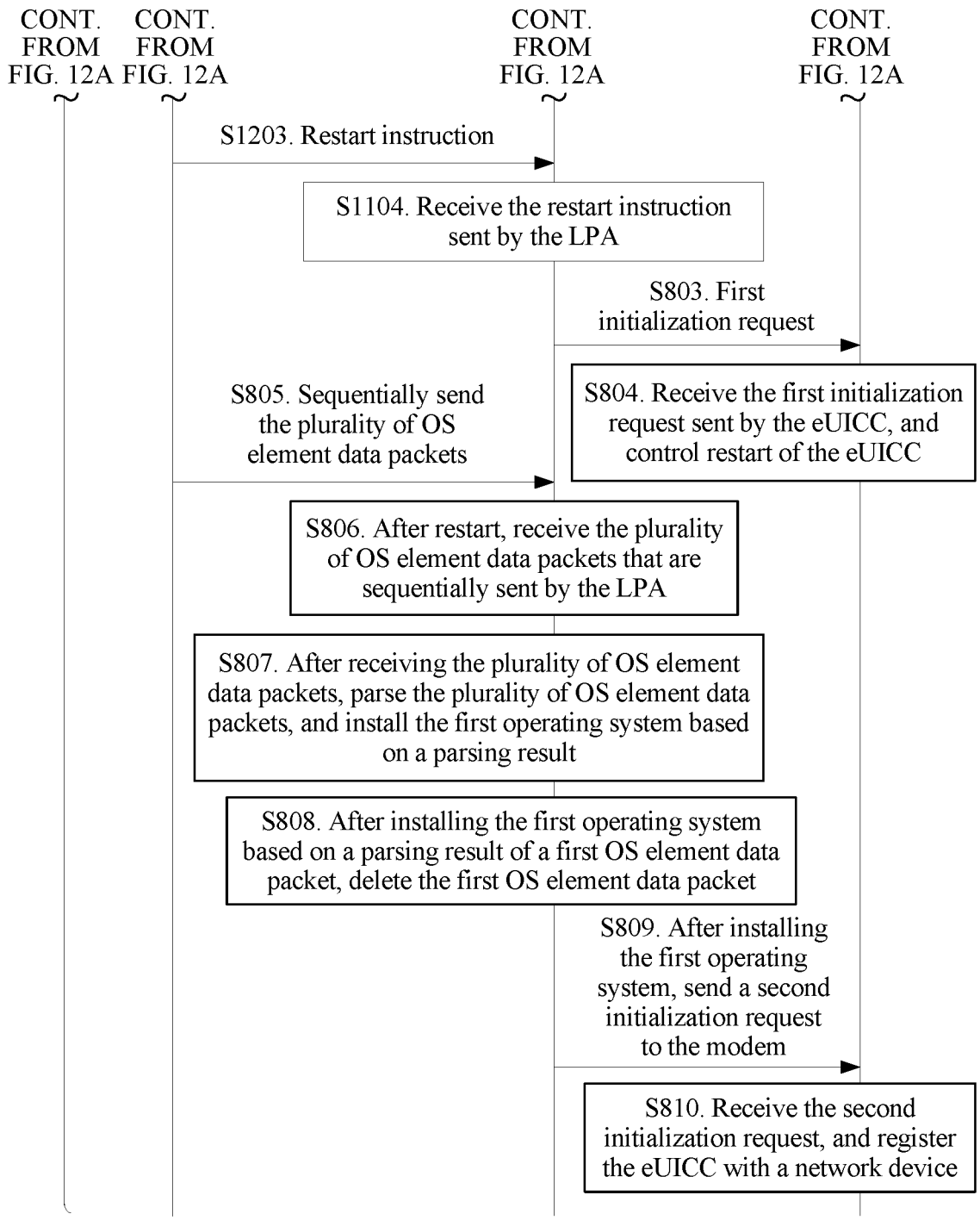

Because the second indication information is used to indicate that the remaining storage space of the eUICC is sufficient for storing the installation file of the first operating system and installing the first operating system, the eUICC may parse, only after the eUICC is restarted and receives all of the plurality of OS element data packets, the OS element data packets received by the eUICC, and install the first operating system based on a parsing result. To be specific, as shown in FIG. 12B, after S1203, the method in this embodiment of the present invention may further include S804 to S810.

Figure 13A:
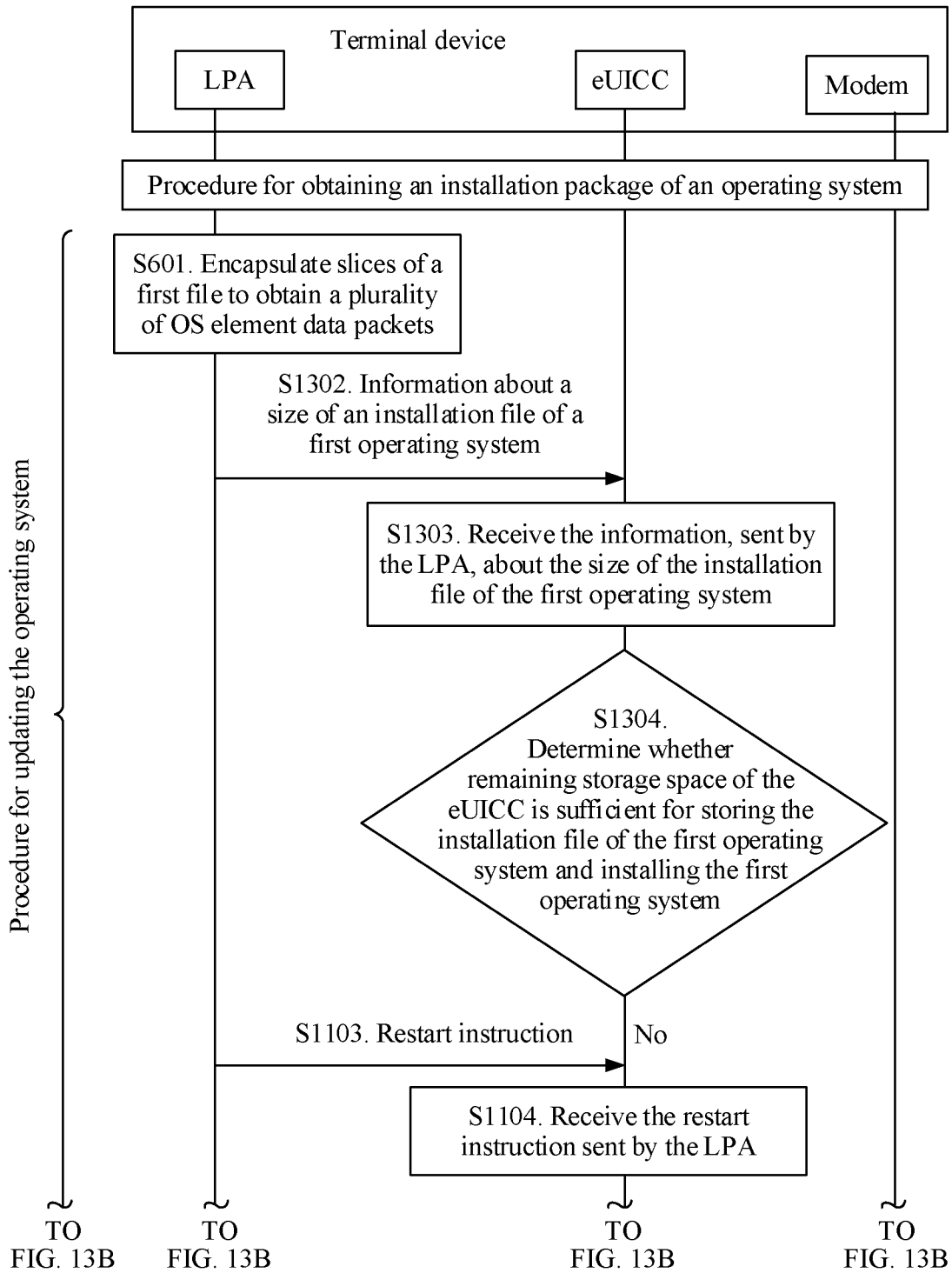
FIG. 13A and FIG. 13B are a flowchart of a method for updating an operating system according to an embodiment of the present invention.
Figure 13B:
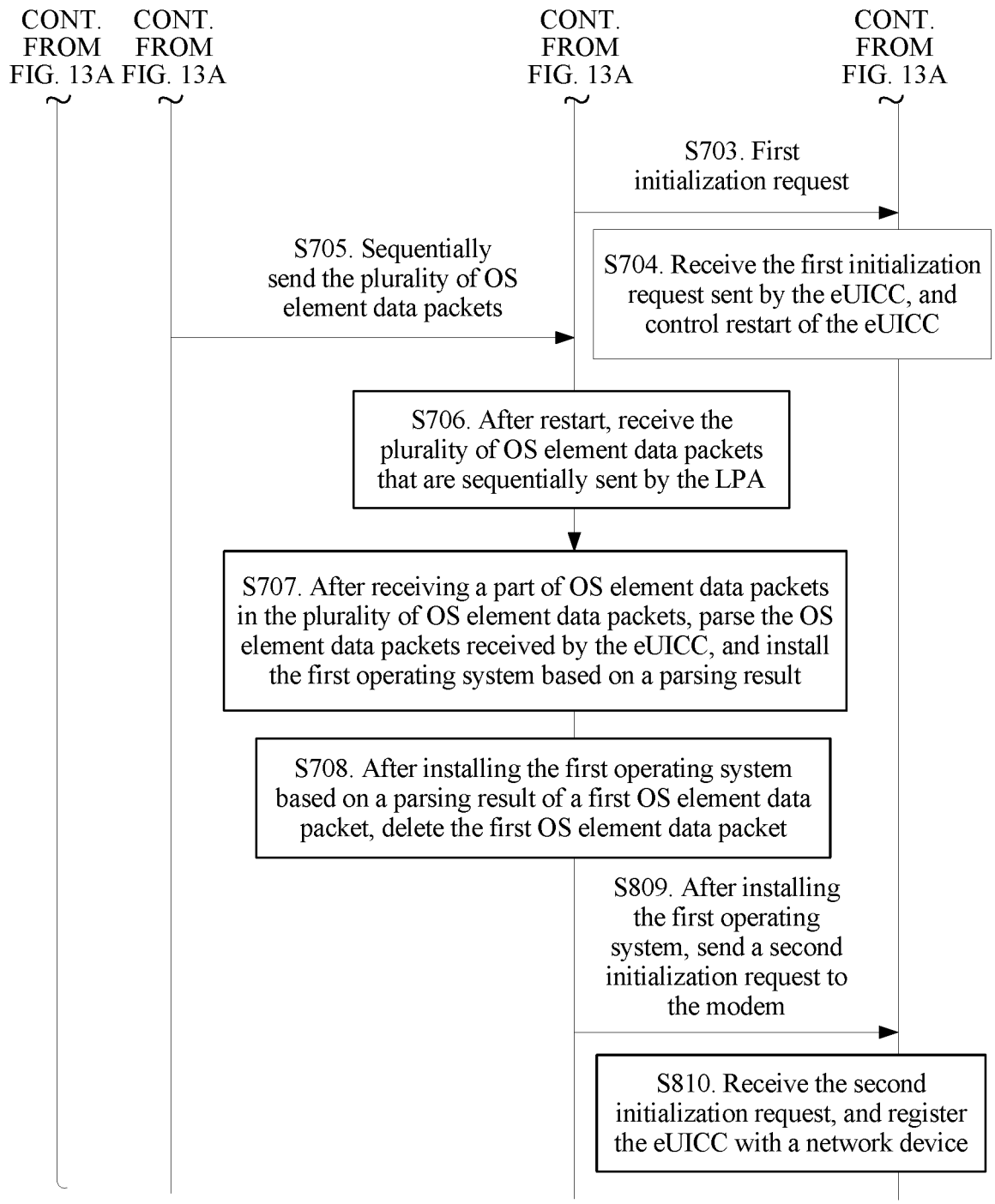

In a second implementation of the second application scenario, the eUICC may determine whether the remaining storage space of the eUICC is sufficient for storing the installation file of the first operating system and installing the first operating system. Specifically, in the second implementation of the second application scenario, as shown in FIG. 13A, S602 to S604, and S1101 and S1102 shown in FIG. 11A may be replaced with S1301 to S1303.

S1301. The LPA sends information about a size of the installation file of the first operating system to the eUICC.

S1302. The eUICC receives the information, sent by the LPA, about the size of the installation file of the first operating system.

S1303. The eUICC determines, based on information about a size of remaining storage space of the eUICC and the information about the size of the installation file of the first operating system, whether the remaining storage space of the eUICC is sufficient for storing the installation file of the first operating system and installing the first operating system.

Specifically, if the eUICC determines that the remaining storage space of the eUICC is insufficient for storing the installation file of the first operating system and installing the first operating system, the eUICC may install the first operating system in a manner of "installing while receiving"; or if the eUICC determines that the remaining storage space of the eUICC is sufficient for storing the installation file of the first operating system and installing the first operating system, the eUICC may install the first operating system in a manner of "installing after receiving".

In the first or the second implementation of the second application scenario, the foregoing first file may be the installation file of the first operating system (that is, the full installation file of the first operating system). In the two implementations, the eUICC can complete the installation of the first operating system based on only the full installation file of the first operating system, without referring to the installation file of the second operating system.

However, in a third implementation and a fourth implementation of the second application scenario, the first file may be the incremental file of the first operating system relative to the second operating system. To be specific, when the eUICC installs the first operating system, the used installation file is the installation file obtained by combining the first file with the installation file of the second operating system.

In the third implementation of the second application scenario, the LPA may combine the first file with the installation file of the second operating system to obtain the installation file of the first operating system. For a specific method for combining the first file with the installation file of the second operating system to obtain the installation file of the first operating system by the LPA, refer to the related description in the first application scenario. Details are not described again herein in this embodiment of the present invention.

In the fourth implementation of the second application scenario, the LPA may directly encapsulate slices of the first file and send the encapsulated slices of the first file to the eUICC; and the eUICC combines the first file with the installation file of the second operating system to obtain the installation file of the first operating system. If the eUICC needs to combine the first file with the installation file of the second operating system to obtain the installation file of the first operating system, it is ensured that remaining storage space of the eUICC is sufficient for storing the installation file of the first operating system and installing the first operating system, so that the eUICC can have sufficient storage space for storing the first file and the installation file of the second operating system. For a specific method for combining the first file with the installation file of the second operating system to obtain the installation file of the first operating system by the eUICC, refer to the related description in the first application scenario. Details are not described again herein in this embodiment of the present invention.

Figure 14A:
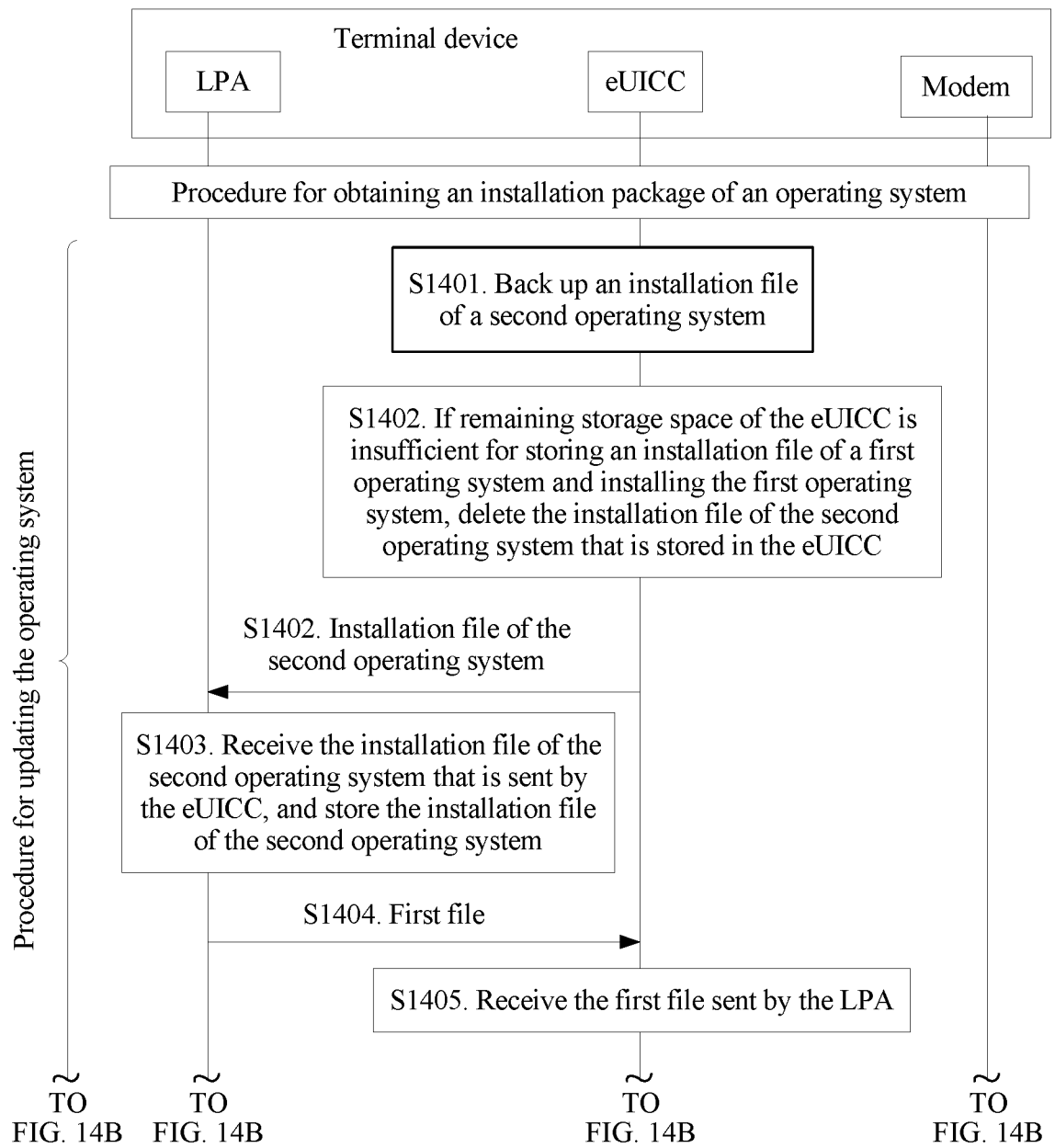
FIG. 14A and FIG. 14B are a flowchart of a method for updating an operating system according to an embodiment of the present invention.
Figure 14B:
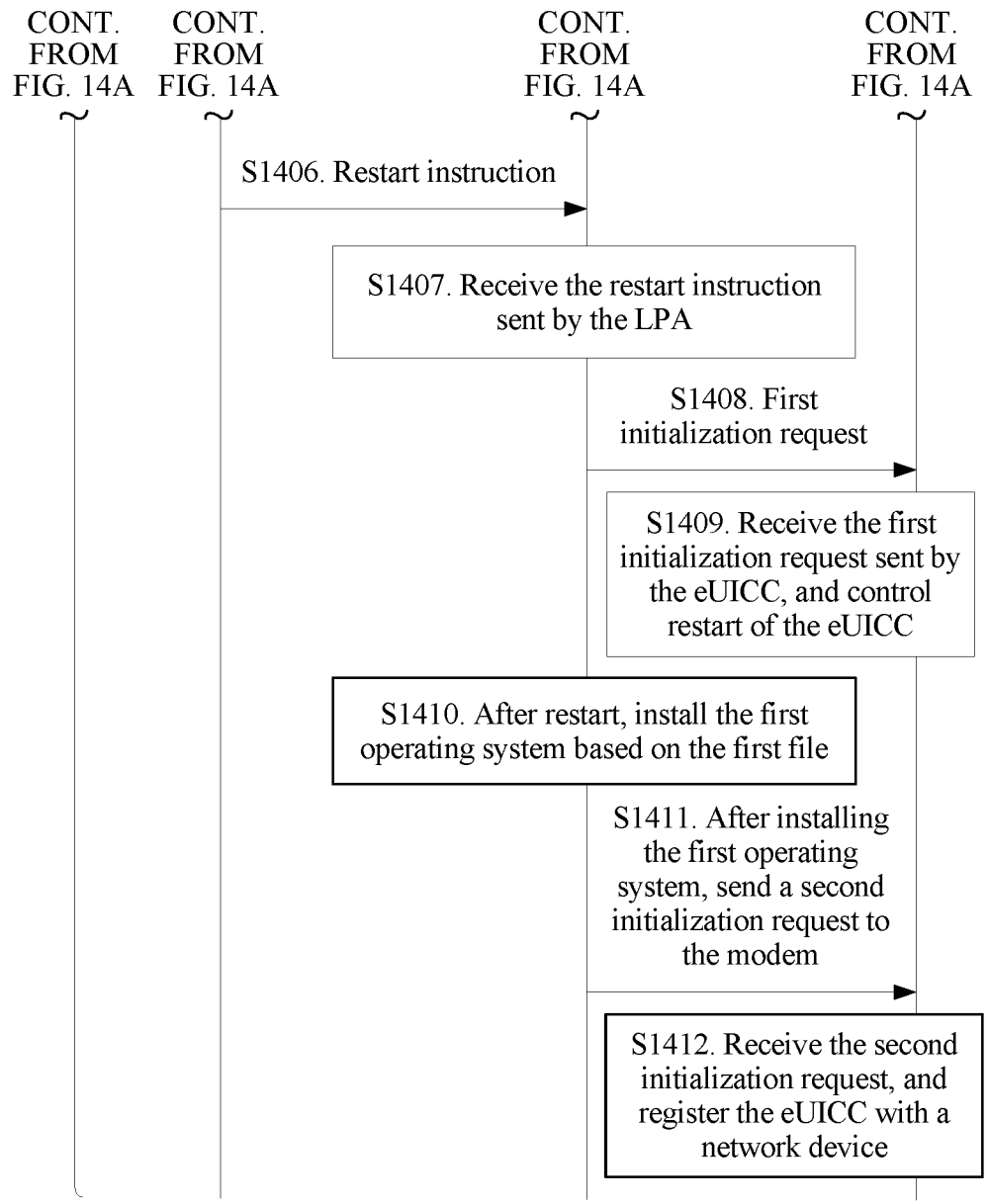

In a third application scenario of this embodiment of the present invention, when remaining storage space of the eUICC is insufficient for storing the installation file of the first operating system and installing the first operating system, the LPA may back up the installation file of the second operating system. Because the eUICC does not need to back up the installation file of the second operating system, the eUICC may have sufficient storage space for installing the first operating system. As described in FIG. 14A and FIG. 14B, the procedure for updating the operating system may include S1401 and a subsequent procedure.

S1401. The eUICC backs up the installation file of the second operating system.

S1402. If remaining storage space of the eUICC is insufficient for storing the installation file of the first operating system and installing the first operating system, the eUICC sends the installation file of the second operating system to the LPA of the terminal device, and deletes the installation file of the second operating system that is stored in the eUICC.

In the third application scenario of this embodiment of the present invention, the LPA may determine whether the remaining storage space of the eUICC is sufficient for storing the installation file of the first operating system and installing the first operating system, and then notify the eUICC of a determining result; or the eUICC may determine whether the remaining storage space of the eUICC is sufficient for storing the installation file of the first operating system and installing the first operating system. For a specific method for determining, by the LPA or the eUICC, whether the remaining storage space of the eUICC is sufficient for storing the installation file of the first operating system and installing the first operating system, refer to detailed descriptions in the first application scenario or the second application scenario. Details are not described again herein in this embodiment of the present invention.

S1403. The LPA receives the installation file of the second operating system that is sent by the eUICC, and stores the installation file of the second operating system.

S1404. The LPA sends the first file to the eUICC.

S1405. The eUICC receives the first file sent by the LPA.

S1406. The LPA sends a restart instruction to the eUICC.

S1407. The eUICC receives the restart instruction sent by the LPA.

S1408. The eUICC sends a first initialization request to a modem.

S1409. The modem receives the first initialization request sent by the eUICC, and controls restart of the eUICC.

S1410. After the eUICC is restarted, the eUICC installs the first operating system based on the first file.

When the first file is the incremental file of the first operating system relative to the second operating system, the foregoing S1410 may be replaced with S1410a and S1410b.

S1410a. After the eUICC is restarted, the eUICC combines the first file with the installation file of the second operating system to obtain the installation file of the first operating system.

S1410b. The eUICC installs the first operating system based on the installation file of the first operating system.

S1411. After the eUICC installs the first operating system, the eUICC sends a second initialization request to the modem, requesting the modem to register the eUICC with a network device.

S1412. The modem receives the second initialization request, and registers the eUICC with the network device.

Further, to release the storage space of the eUICC, the eUICC may delete the installation file of the first operating system after the eUICC installs the first operating system.

For detailed descriptions about the first file, the restart instruction, the first initialization request, the second initialization request, and the like in the third application scenario of this embodiment of the present invention, refer to detailed descriptions in the first or the second application scenario. Details are not described again herein in this embodiment of the present invention.

In a method for updating an operating system according to this embodiment of the present invention, the LPA stores the backup installation file of the second operating system. Therefore, even if the eUICC determines that the remaining storage space of the eUICC is insufficient for storing the installation file of the first operating system and installing a first COS, because the eUICC does not need to store the backup installation file of the second operating system, a possibility that the eUICC cannot install the new operating system because the operating system of the eUICC fails to be updated due to a limited capacity of the storage space of the eUICC can be reduced.

Solutions provided by exemplary embodiments of this application are described above mainly from a perspective of interaction between the ODS, the eUICC, and the LPA. It may be understood that, to implement the foregoing functions, the eUICC and the LPA may include corresponding functional modules for performing the functions. A person skilled in the art should be easily aware that, this application can be implemented by hardware or a combination of hardware and computer software with reference to an access network device and an application function device and algorithm steps in the examples described in embodiments disclosed in this specification. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the eUICC and the LPA may be divided based on the foregoing method examples. For example, each functional module or unit may be defined in a correspondence to each function, or two or more functions may be integrated in one processing module. The foregoing integrated module may be implemented in a form of hardware, or may be implemented in a form of a software module or unit. In embodiments of this application, module or unit division is an example, and is merely logical function division. In actual implementation, another division manner may be used.

Figure 15:
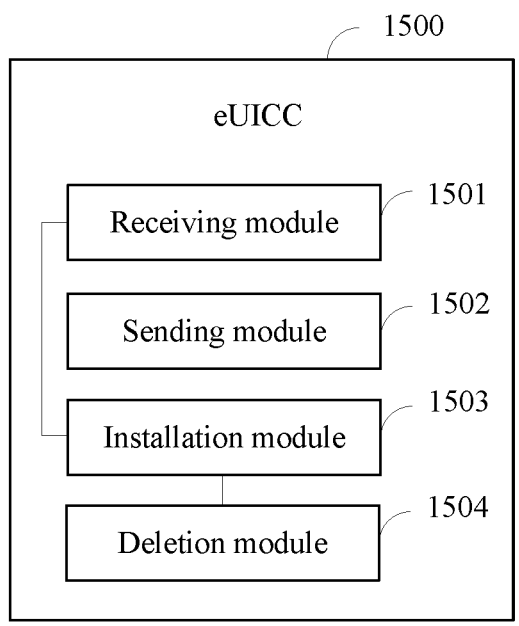
FIG. 15 is a schematic diagram of a structure of an eUICC according to an embodiment of the present invention.

FIG. 15 is a schematic diagram of a possible structure of an eUICC in the foregoing embodiment. The eUICC 1500 includes a receiving module 1501, a sending module 1502, an installation module 1503, and a deletion module 1504.

The receiving module 1501 is configured to support S702, S706, S802, S806, S902, S905, and S1102 discussed above, and/or used in other processes of the technology described in this specification. The sending module 1502 is configured to support S602, S703, S803, S809, S904, S906, S1101, S1104, S1202, S1204, and S1302 discussed above, and/or used in other processes of the technology described in this specification. The installation module 1503 is configured to support S707, S807, S807*a*, and S807*b* discussed above, and/or used in other processes of the technology described in this specification. The deletion module 1504 is configured to support S708 and S808 discussed above, and/or used in other processes of the technology described in this specification.

Further, the eUICC 1500 shown in FIG. 15 may further include a determining module 1505. The determining module 1505 is configured to support S903 and S1303 discussed above, and/or used in other processes of the technology described in this specification.

The eUICC 1500 may include but is not limited to the modules illustrated above. For example, the eUICC 1500 may further include a storage module configured to store an operating system (for example, a first operating system) of the eUICC, or the like. In addition, functions that the modules can specifically implement include but are not limited to the functions corresponding to the method steps discussed above. For other units of the eUICC 1500 and detailed descriptions about the units of the eUICC 1500, refer to the detailed descriptions about the method steps corresponding to the units. Details are not described again herein in this embodiment of this application.

When an integrated unit is used, the determining module 1505, the installation module 1503, the deletion module 1504, and the like may be integrated in one processing unit for implementation. The processing unit may be a processor or a controller, for example, may be a CPU, a general purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various exemplary logical blocks, modules, and circuits described with reference to content disclosed in this application. The processing unit may be a combination implementing a computing function, for example, a combination of one or more microprocessors, or a combination of a DSP and a microprocessor. The receiving module 1501 and the sending module 1502 may be integrated in one communications unit for implementation, where the communications unit may be a communications interface, a transceiver circuit, a transceiver, or the like.

Figure 16:
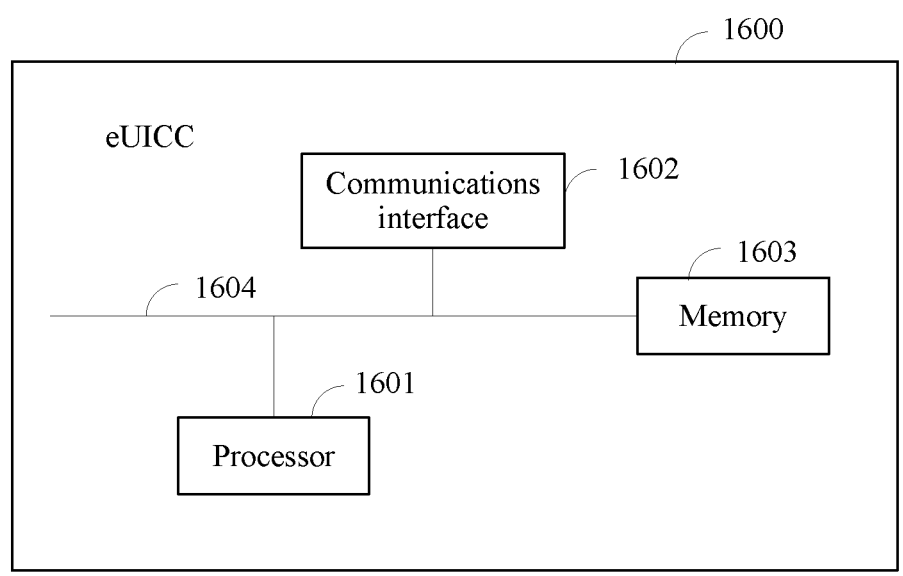
FIG. 16 is a schematic diagram of a structure of an eUICC according to an embodiment of the present invention.

When the processing unit is a processor, and the communications unit is a communications interface, the eUICC 1500 in this embodiment of this application may be an eUICC 1600 shown in FIG. 16. As shown in FIG. 16, the eUICC 1600 includes a processor 1601, a communications interface 1602, a memory 1603, and a bus 1604. The processor 1601, the communications interface 1602, and the memory 1603 are interconnected by using the bus 1604. The memory is configured to store computer program code, the computer program code includes an instruction, and when the processor 1601 of the eUICC 1600 executes the instruction, the eUICC 1600 performs related method steps in any one of FIG. 5A and FIG. 5B to FIG. 7A and FIG. 7B, and FIG. 9A and FIG. 9B to FIG. 14A and FIG. 14B to interact with devices such as an application function device, a core network device, and a terminal to implement a method for updating an operating system in a foregoing embodiment.

The bus 1604 may be a peripheral component interconnect (PCI) bus or an extended industry standard architecture (EISA) bus or the like. The bus 1604 may be classified into an address bus, a data bus, a control bus, and the like. For ease of representation, only one thick line is used to represent the bus in FIG. 16, but this does not mean that there is only one bus or only one type of bus.

This embodiment of this application further provides a computer storage medium, where the computer storage medium stores computer program code, and when the processor 1601 of the eUICC 1600 executes the computer program code, the eUICC 1600 performs related method steps in any one of FIG. 5A and FIG. 5B to FIG. 7A and FIG. 7B, and FIG. 9A and FIG. 9B to FIG. 14A and FIG. 14B to interact with a device such as an application function device to implement a method for updating an operating system in a foregoing embodiment.

For detailed descriptions about the modules in the eUICC provided by this embodiment of this application and technical effects brought by the modules by performing the related method steps in any one of FIG. 5A and FIG. 5B to FIG. 7A and FIG. 7B, and FIG. 9A and FIG. 9B to FIG. 14A and FIG. 14B, refer to related descriptions discussed above of this application. Details are not described again herein.

Figure 17:
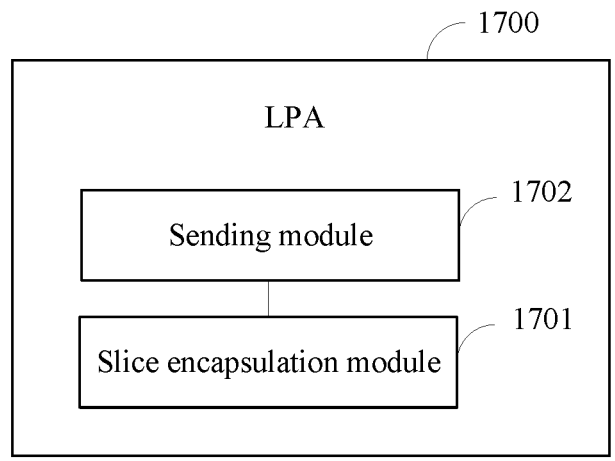
FIG. 17 is a schematic diagram of a structure of an LPA according to an embodiment of the present invention.

FIG. 17 is a schematic diagram of a possible structure of an LPA in the foregoing embodiment. The LPA 1700 includes a slice encapsulation module 1701 and a sending module 1702. The slice encapsulation module 1701 is configured to support S601 and S601' discussed above, and/or used in other processes of the technology described in this specification. The sending module 1702 is configured to support S701, S705, S801, S805, S901, S1101, S1103, S1201, S1203, and S1201 discussed above, and/or used in other processes of the technology described in this specification.

Figure 18:
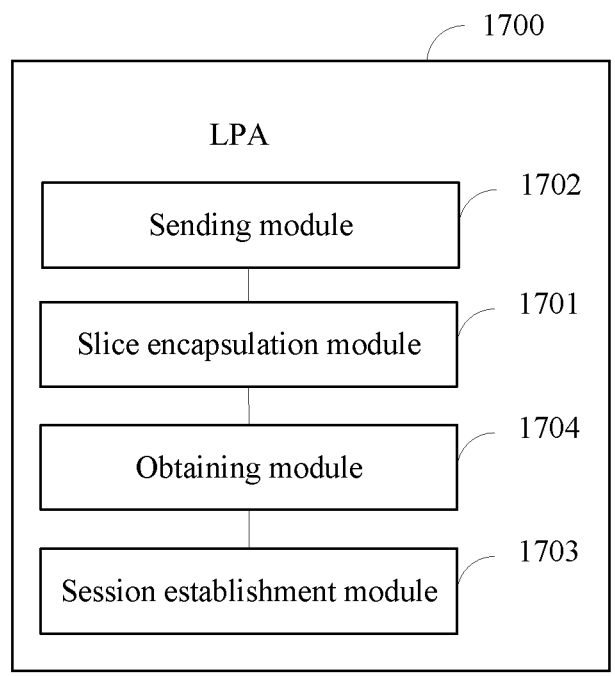
FIG. 18 is a schematic diagram of a structure of an LPA according to an embodiment of the present invention.

Further, as shown in FIG. 18, the LPA 1700 shown in FIG. 17 may further include a session establishment module 1703 and an obtaining module 1704. The session establishment module 1703 is configured to support S513 discussed above, and/or used in other processes of the technology described in this specification. The obtaining module 1704 is configured to support S514 discussed above, and/or used in other processes of the technology described in this specification.

Further, the LPA 1700 may further include a receiving module 1705 and a combining module 1706. The receiving module 1705 is configured to support S603, S905, S907, and S1102 discussed above, and/or used in other processes of the technology described in this specification. The combining module 1706 is configured to support the combining operation in S1002 discussed above, and/or used in other processes of the technology described in this specification.

Further, the LPA 1700 may further include a determining module 1707. The determining module 1707 is configured to support S604 discussed above, and/or used in other processes of the technology described in this specification.

The LPA 1700 may include but is not limited to the modules illustrated above. In addition, functions that the modules can specifically implement include but are not limited to the functions corresponding to the method steps discussed above. For other units of the LPA 1700 and detailed descriptions about the units of the LPA 1700, refer to the detailed descriptions about the method steps corresponding to the units. Details are not described again herein in this embodiment of this application.

When an integrated unit is used, the slice encapsulation module 1701, the determining module 1707, the combining module 1706, the session establishment module 1703, the obtaining module 1704, and the like may be integrated in one processing unit for implementation. The processing unit may be a processor or a controller, for example, may be a CPU, a general purpose processor, a DSP, an ASIC, an FPGA or another programmable logic device, a transistor logic device, a hardware component, or any combination thereof. The processing unit may implement or execute various exemplary logical blocks, modules, and circuits described with reference to content disclosed in this application. The processing unit may be a combination implementing a computing function, for example, a combination of one or more microprocessors, or a combination of a DSP and a microprocessor. The receiving module 1705 and the sending module 1702 may be integrated in one communications unit for implementation, where the communications unit may be a communications interface, a transceiver circuit, a transceiver, or the like.

Figure 19:
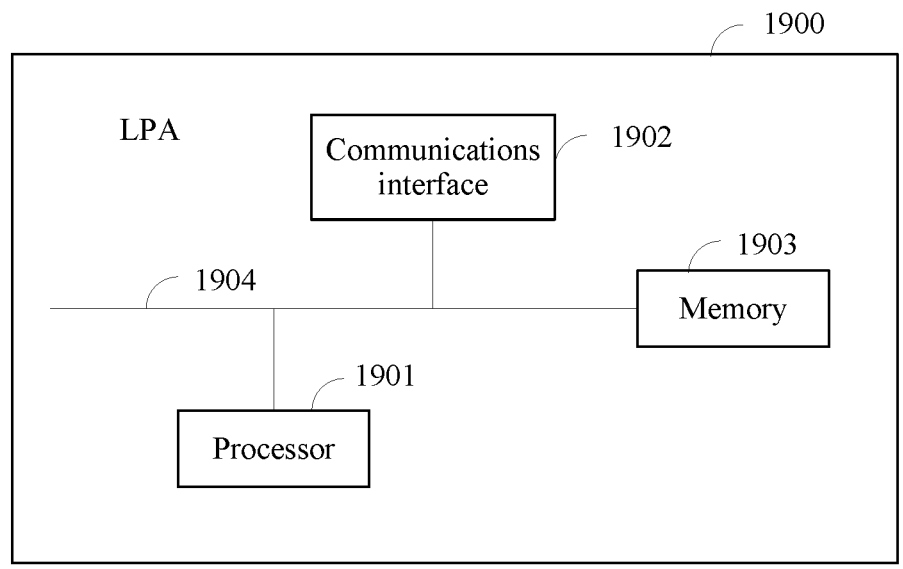
FIG. 19 is a schematic diagram of a structure of an LPA according to an embodiment of the present invention.

When the processing unit is a processor, and the communications unit is a communications interface, the LPA 1700 in this embodiment of this application may be an LPA 1900 shown in FIG. 19. As shown in FIG. 19, the LPA 1900 includes a processor 1901, a communications interface 1902, a memory 1903, and a bus 1904. The processor 1901, the communications interface 1902, and the memory 1903 are interconnected by using the bus 1904. The memory is configured to store computer program code, the computer program code includes an instruction, and when the processor 1901 of the LPA 1900 executes the instruction, the LPA 1900 performs related method steps in any one of FIG. 5A and FIG. 5B to FIG. 7A and FIG. 7B, and FIG. 9A and FIG. 9B to FIG. 14A and FIG. 14B to implement a method for updating an operating system in a foregoing embodiment.

The bus 1904 may be a PCI bus or an EISA bus or the like. The bus 1904 may be classified into an address bus, a data bus, a control bus, and the like. For ease of representation, only one thick line is used to represent the bus in FIG. 19, but this does not mean that there is only one bus or only one type of bus.

This embodiment of this application further provides a computer storage medium, where the computer storage medium stores computer program code, and when the processor 1901 of the LPA 1900 executes the computer program code, the LPA 1900 performs related method steps in any one of FIG. 5A and FIG. 5B to FIG. 7A and FIG. 7B, and FIG. 9A and FIG. 9B to FIG. 14A and FIG. 14B to implement a method for updating an operating system in a foregoing embodiment.

For detailed descriptions about the units in the LPA 1900 provided by this embodiment of this application and technical effects brought by the units or modules by performing the related method steps in any one of FIG. 5A and FIG. 5B to FIG. 7A and FIG. 7B, and FIG. 9A and FIG. 9B to FIG. 14A and FIG. 14B, refer to related descriptions discussed above of this application. Details are not described again herein.

Figure 20:
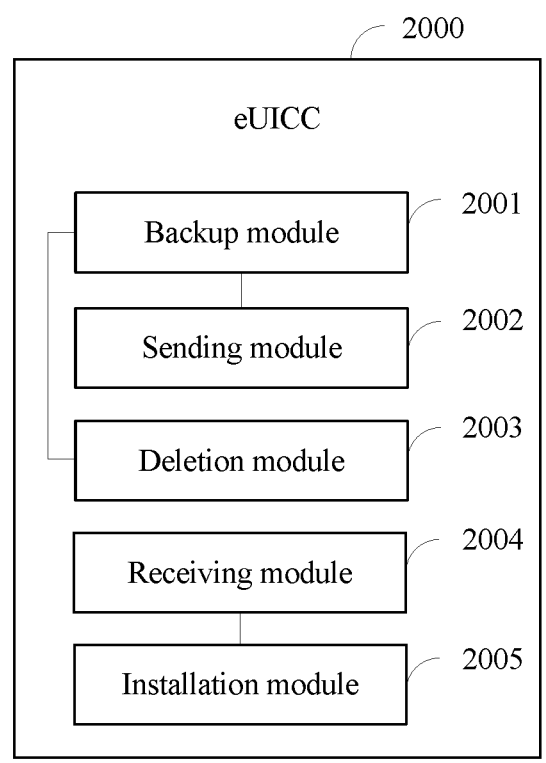
FIG. 20 is a schematic diagram of a structure of an eUICC according to an embodiment of the present invention.

FIG. 20 is a schematic diagram of a possible structure of an eUICC in the foregoing embodiment. The eUICC 2000 includes a backup module 2001, a sending module 2002, a deletion module 2003, a receiving module 2004, and an installation module 2005. The backup module 2001 is configured to support S1401 discussed above, and/or used in other processes of the technology described in this specification. The sending module 2002 is configured to support the sending operation in S1402, and S1408 and S1411 discussed above, and/or used in other processes of the technology described in this specification. The deletion module 2003 is configured to support the deletion operation in S1402 discussed above, and/or used in other processes of the technology described in this specification. The receiving module 2004 is configured to support S1405 and S1407 discussed above, and/or used in other processes of the technology described in this specification. The installation module 2005 is configured to support S1410, S1410*a*, and S1410*b* discussed above, and/or used in other processes of the technology described in this specification.

The eUICC 2000 may include but is not limited to the modules illustrated above. For example, the eUICC 2000 may further include a storage module configured to store an operating system (for example, a first operating system) of the eUICC, or the like. In addition, functions that the modules can specifically implement include but are not limited to the functions corresponding to the method steps discussed above. For other units of the eUICC 2000 and detailed descriptions about the units of the eUICC 2000, refer to the detailed descriptions about the method steps corresponding to the units. Details are not described again herein in this embodiment of this application.

When an integrated unit is used, the backup module 2001, the deletion module 2003, the installation module 2005, and the like may be integrated in one processing unit for implementation. The processing unit may be a processor or a controller, for example, may be a CPU, a general purpose processor, a DSP, an ASIC, an FPGA or another programmable logic device, a transistor logic device, a hardware component, or any combination thereof. The processing unit may implement or execute various exemplary logical blocks, modules, and circuits described with reference to content disclosed in this application. The processing unit may be a combination implementing a computing function, for example, a combination of one or more microprocessors, or a combination of a DSP and a microprocessor. The receiving module 2004 and the sending module 2002 may be integrated in one communications unit for implementation, where the communications unit may be a communications interface, a transceiver circuit, a transceiver, or the like.

When the processing unit is a processor, and the communications unit is a communications interface, the eUICC 2000 in this embodiment of this application may be the eUICC 1600 shown in FIG. 16. For detailed descriptions about the eUICC 1600, refer to the foregoing descriptions. Details are not described again herein.

The foregoing descriptions about implementations allow a person skilled in the art to understand that, for the purpose of convenient and brief description, division of the foregoing functional modules is used as an example for illustration. In actual application, the foregoing functions can be allocated to different modules and implemented based on requirements, that is, an internal structure of an apparatus is divided into different functional modules to implement all or some of the functions described above. For a detailed working process of the foregoing system, apparatus, and unit, refer to a corresponding process in a foregoing method embodiment. Details are not described herein again.

With respect to exemplary embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of this application may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely exemplary implementations of this application and are not intended to limit the protection scope of this application. Any variation or replacement within the technical scope disclosed in this application may fall within the protection scope of this application.

Additionally, statements made herein characterizing the invention refer to an embodiment of the invention and not necessarily all embodiments.

What is claimed is:

1. A method for updating an operating system (OS), comprising:
   receiving, by an embedded universal integrated circuit card (eUICC), a restart instruction from a local profile assistant (LPA) of a terminal device, wherein the restart instruction is for instructing the eUICC to perform a restart operation;
   sending, by the eUICC, a first initialization request to a modem of the terminal device, wherein the first initialization request is for requesting the modem of the terminal device to control restart of the eUICC;
   receiving, by the eUICC after being restarted, a plurality of OS element data packets from the LPA, wherein the plurality of OS element data packets are slice files of an installation file of a first OS, and wherein the plurality of OS element data packets are received by the eUICC from the LPA in a sequence;
   parsing, by the eUICC, the plurality of OS element data packets to install the first OS, wherein parsing the plurality of OS element data packets includes: after receiving a first part of the plurality of OS element data packets and prior to all OS element data packets for installing the first OS being received, parsing the first part of the plurality of OS element data packets to install a first part of the first OS corresponding to the first part of the plurality of OS element data packets; and
   after installing the first part of the first OS, deleting, by the eUICC, the first part of the plurality of OS element data packets.

2. The method according to claim 1, wherein the restart instruction carries a first update instruction, and the first update instruction is for instructing the eUICC to parse the OS element data packets received by the eUICC and install the first OS.

3. The method according to claim 2, wherein before receiving the restart instruction, the method further comprises:
   sending, by the eUICC, information about a size of remaining storage space of the eUICC to the LPA, wherein the remaining storage space of the eUICC is remaining storage space after the eUICC stores a subscription information set and an application and backs up an installation file of a currently installed OS.

4. The method according to claim 2, wherein before receiving the restart instruction, the method further comprises:
   receiving, by the eUICC, information from the LPA about a size of the installation file of the first OS;
   determining, by the eUICC based on the information about the size of the installation file of the first OS and information about a size of remaining storage space of the eUICC, that the remaining storage space of the eUICC is insufficient for storing the installation file of the first OS and installing the first OS; and
   sending, by the eUICC, first indication information to the LPA, wherein the first indication information indicates that the remaining storage space of the eUICC is insufficient for storing the installation file of the first OS and installing the first OS.

5. The method according to claim 1, wherein parsing the first part of the plurality of OS element data packets to install the first part of the first OS is performed based on remaining storage space of the eUICC being insufficient for storing the installation file of the first OS and installing the first OS;
   wherein the remaining storage space of the eUICC is remaining storage space after the eUICC stores a subscription information set and an application and backs up an installation file of a currently installed OS.

6. The method according to claim 5, wherein before parsing the first part of the plurality of OS element data packets to install the first part of the first OS, the method further comprises:
   sending, by the eUICC, information about a size of the remaining storage space of the eUICC to the LPA; and
   receiving, by the eUICC, first indication information from the LPA, wherein the first indication information indicates that the remaining storage space of the eUICC is insufficient for storing the installation file of the first OS and installing the first OS.

7. The method according to claim 5, wherein before parsing the first part of the plurality of OS element data packets to install the first part of the first OS, the method further comprises:
   receiving, by the eUICC, information from the LPA about a size of the installation file of the first OS; and
   determining, by the eUICC, based on the information about the size of the installation file of the first OS and information about a size of the remaining storage space of the eUICC, that the remaining storage space of the eUICC is insufficient for storing the installation file of the first OS and installing the first OS.

8. The method according to claim 1, wherein before receiving the plurality of OS element data packets, the method further comprises:
sending, by the eUICC, an installation file of a currently installed OS to the LPA.

9. The method according to claim 1, wherein the installation file of the first OS comprises an initialize secure channel (ISC) field, a store metadata for operating system image (SMO) field, an operating system image key (OIK) field, and payload information of an installation package of the first OS;
wherein the ISC field is for initializing a secure channel for transmitting the installation file of the first OS;
wherein the SMO field comprises metadata of the first OS, the metadata of the first OS comprising eUICC manufacturer (EUM) information, information about a size of the first OS, and version information of the first OS; and
wherein the OIK field is for encrypting the plurality of OS element data packets.

10. The method according to claim 9, wherein the plurality of OS element data packets comprise an ISC data packet, an SMO data packet, an OIK data packet, and at least one payload data packet;
wherein the ISC data packet is obtained by encapsulating the ISC field, the SMO data packet is obtained by encapsulating the SMO field, the OIK data packet is obtained by encapsulating the OIK field, and the at least one payload data packet is obtained by encapsulating a slice of the payload information of the installation package of the first OS.

11. An electronic device, comprising:
an embedded universal integrated circuit card (eUICC); and
a modem;
wherein the eUICC comprises a processor, a memory, and a communications interface;
wherein the processor, the memory, and the communications interface are connected via a bus, the memory is configured to store instructions, and the instructions, when executed by the processor, facilitate the following being performed by the eUICC:
receiving a restart instruction from a local profile assistant (LPA) of the electronic device, wherein the restart instruction is for instructing the eUICC to perform a restart operation;
sending a first initialization request to the modem of the electronic device, wherein the first initialization request is for requesting the modem of the electronic device to control restart of the eUICC;
receiving, after being restarted, a plurality of operating system (OS) element data packets from the LPA, wherein the plurality of OS element data packets are slice files of an installation file of a first OS, and wherein the plurality of OS element data packets are received by the eUICC from the LPA in a sequence;
parsing the plurality of OS element data packets to install the first OS, wherein parsing the plurality of OS element data packets includes: after receiving a first part of the plurality of OS element data packets and prior to all OS element data packets for installing the first OS being received, parsing the first part of the plurality of OS element data packets to install a first part of the first OS corresponding to the first part of the plurality of OS element data packets; and after installing the first part of the first OS, deleting the first part of the plurality of OS element data packets.

12. The electronic device according to claim 11, wherein the restart instruction carries a first update instruction, and the first update instruction is for instructing the eUICC to parse the OS element data packets received by the eUICC and install the first OS.

13. The electronic device according to claim 12, wherein the instructions, when executed by the processor, further facilitate the following being performed by the eUICC before receiving the restart instruction:
sending information about a size of remaining storage space of the eUICC to the LPA, wherein the remaining storage space of the eUICC is remaining storage space after the eUICC stores a subscription information set and an application and backs up an installation file of a currently installed OS.

14. The electronic device according to claim 12, wherein the instructions, when executed by the processor, further facilitate the following being performed by the eUICC before receiving the restart instruction:
receiving information from the LPA about a size of the installation file of the first OS;
determining, based on the information about the size of the installation file of the first OS and information about a size of remaining storage space of the eUICC, that the remaining storage space of the eUICC is insufficient for storing the installation file of the first OS and installing the first OS; and
sending first indication information to the LPA, wherein the first indication information indicates that the remaining storage space of the eUICC is insufficient for storing the installation file of the first OS and installing the first OS.

15. The electronic device according to claim 11, wherein parsing the first part of the plurality of OS element data packets to install the first part of the first OS is based on remaining storage space of the eUICC being insufficient for storing the installation file of the first OS and installing the first OS, wherein the remaining storage space of the eUICC is remaining storage space after the eUICC stores a subscription information set and an application and backs up an installation file of a currently installed OS.

16. The electronic device according to claim 15, wherein the instructions, when executed by the processor, further facilitate the following being performed by the eUICC before parsing the first part of the plurality of OS element data packets to install the first part of the first OS:
sending information about a size of the remaining storage space of the eUICC to the LPA; and
receiving first indication information from the LPA, wherein the first indication information indicates that the remaining storage space of the eUICC is insufficient for storing the installation file of the first OS and installing the first OS.

17. The electronic device according to claim 15, wherein the instructions, when executed by the processor, further facilitate the following being performed by the eUICC before parsing the first part of the plurality of OS element data packets to install the first part of the first OS:
receiving information from the LPA about a size of the installation file of the first OS; and
determining, based on the information about the size of the installation file of the first OS and information about a size of the remaining storage space of the eUICC, that the remaining storage space of the eUICC is insufficient for storing the installation file of the first OS and installing the first OS.

18. The electronic device according to claim 11, wherein the instructions, when executed by the processor, further facilitate the following being performed by the eUICC before receiving the plurality of OS element data packets:
  sending an installation file of a currently installed OS to the LPA.

19. The electronic device according to claim 11, wherein the installation file of the first OS comprises an initialize secure channel (ISC) field, a store metadata for operating system image (SMO) field, an operating system image key (OIK) field, and payload information of an installation package of the first OS;
  wherein the ISC field is for initializing a secure channel for transmitting the installation file of the first OS;
  wherein the SMO field comprises metadata of the first OS, the metadata of the first OS comprising eUICC manufacturer (EUM) information, information about a size of the first OS, and version information of the first OS; and
  wherein the OIK field is for encrypting the plurality of OS element data packets.

20. The electronic device according to claim 19, wherein the plurality of OS element data packets comprise an ISC data packet, an SMO data packet, an OIK data packet, and at least one payload data packet:
  wherein the ISC data packet is obtained by encapsulating the initialize secure channel field, the SMO data packet is obtained by encapsulating the SMO field, the OIK data packet is obtained by encapsulating the OIK field, and the at least one payload data packet is obtained by encapsulating a slice of the payload information of the installation package of the first OS.

* * * * *